(12) United States Patent
Posey et al.

(10) Patent No.: US 11,287,550 B2
(45) Date of Patent: Mar. 29, 2022

(54) LEADS AND POLYNYAS FORECASTING

(71) Applicant: The Government of the United States of America, as represented by the Secretary of the Navy, Arlington, VA (US)

(72) Inventors: Pamela Posey, Carriere, MS (US); Richard Arthur Allard, Pass Christian, MS (US); Julia Crout, Slidell, LA (US); Gregg Arthur Jacobs, Slidell, LA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 688 days.

(21) Appl. No.: 15/470,373

(22) Filed: Mar. 27, 2017

(65) Prior Publication Data

US 2017/0276835 A1 Sep. 28, 2017

Related U.S. Application Data

(60) Provisional application No. 62/313,475, filed on Mar. 25, 2016.

(51) Int. Cl.
  *G01W 1/10* (2006.01)
  *G06T 11/60* (2006.01)
  *G01W 1/00* (2006.01)

(52) U.S. Cl.
  CPC ............ *G01W 1/10* (2013.01); *G06T 11/60* (2013.01); *G01W 1/00* (2013.01); *G01W 2203/00* (2013.01); *Y02A 90/10* (2018.01)

(58) Field of Classification Search
  None
  See application file for complete search history.

(56) References Cited

U.S. PATENT DOCUMENTS

| 9,244,166 | B1 * | 1/2016 | Finley | G01S 13/953 |
| 2005/0251341 | A1 * | 11/2005 | Nielsen | B64F 5/30 |
| | | | | 702/3 |

(Continued)

FOREIGN PATENT DOCUMENTS

| KR | 101603718 | B1 * | 3/2016 |
| RU | 2442194 | C2 * | 2/2012 |

(Continued)

OTHER PUBLICATIONS

Hunke et al. ("CICE: the Los Alamos Sea Ice Model Documentation and Software User's Manual Version 5.1") (Year: 2015).*

(Continued)

*Primary Examiner* — Catherine T. Rastovski
*Assistant Examiner* — Leonard S Liang
(74) *Attorney, Agent, or Firm* — US Naval Research Laboratory; William P. Ladd

(57) ABSTRACT

Embodiments relate to leads and polynyas forecasting. Initially observed ice forecast data is obtained for a geographic area of interest, which is then used to generate an ice grid based on the observed ice data, where the ice grid includes grid cells that map polar regions. At this stage, daily opening rates are determined based on the ice grid, where each daily opening rate indicates an opening speed of a corresponding ice event, and daily convergence strain rates are determined based on the ice grid, where each daily convergence strain rate indicates a convergence of the corresponding ice event. For each day, a daily opening rate is weighted and then adjusting by a daily convergence strain rate. A forecasted opening rate on a target date is determined based on the weighted, adjusted daily opening rates. Predicted openings of the polar region can be rendered based on the forecasted opening rate.

20 Claims, 26 Drawing Sheets
(20 of 26 Drawing Sheet(s) Filed in Color)

(56) References Cited

U.S. PATENT DOCUMENTS

| | | | | |
|---|---|---|---|---|
| 2011/0191284 A1* | 8/2011 | Dalton | ............ | G06N 5/02 |
| | | | | 706/58 |
| 2013/0013207 A1* | 1/2013 | Frejvall | ............ | G01W 1/10 |
| | | | | 702/3 |
| 2014/0341423 A1* | 11/2014 | Anno | ............ | B63B 35/08 |
| | | | | 382/103 |
| 2016/0041304 A1* | 2/2016 | Grzych | ............ | B64D 47/00 |
| | | | | 701/14 |

FOREIGN PATENT DOCUMENTS

| | | | | |
|---|---|---|---|---|
| WO | WO-2013009245 A1 * | 1/2013 | ............ | G01C 13/00 |
| WO | WO-2013181463 A1 * | 12/2013 | ............ | G01W 1/10 |
| WO | WO-2015013249 A2 * | 1/2015 | ............ | G01W 1/10 |
| WO | WO-2016036806 A1 * | 3/2016 | ............ | G06N 3/084 |

OTHER PUBLICATIONS

Amundrud, "Geometrical constraints on the evolution of ridged sea ice"; Journal of Geophysical Research, vol. 109, C06005, doi: 10.1029/2003JC002251, 2004. (Year: 2004).*

Hunke, "Thickness Sensitivities in the CICE sea ice model"; Ocean Modelling 34 (2010) 137-149.; 2010 (Year: 2010).*

Machine Translation for KR101603718 (Year: 2016).*

Machine Translation for RU2442194 (Year: 2009).*

Blunt, Joshua D. et al—"A Tactical Hindsight Calibration Method for Sea Ice Drift Forecasting in the Canadian Beaufort Sea"; Proceedings of the Twenty-third (2013) International Offshore and Polar Engineering, Anchorage, Alaska, USA, Jun. 30-Jul. 5, 2013 (Year: 2013).*

Wikipedia Entry for "Moderate Resolution Imaging Spectroradiometer" (snapshot taken of Feb. 4, 2016 entry using Wayback Machine) (Year: 2016).*

Su, Jie; Wu, Huiding; Zhang, Yunfei; Liu, Qinzheng—"Study of an Ice-ocean Coupled Model for a Regional Sea—the Bohai Sea"; Proceedings of the Thirteenth (2003) International Offshore and Polar Engineering Conference, Honolulu, Hawaii, USA, May 25-30, 2003 (Year: 2003).*

Xian, Yang, & Tian, Yingli (2017). Super-Resolved Fine-Scale Sea Ice Motion Tracking. IEEE Transactions on Geoscience and Remote Sensing, vol. 55, No. 10, Oct. 2017. (Year: 2017).*

Cummings, J.A. and O.M. Smedstad, 2013:Variational data assimilation for the global ocean in Data Assimilation for Atmospheric, Oceanic and Hydrologic Applications (vol. II), Chapter 13, pp. 303-342.

Hunke, E.C. and W. H. Lipscomb,2004: CICE: The Los Alamos Sea Ice Model Documentation and Software User's Manual, Version 3.1, LA-CC-98-16, Los Alamos National Laboratory, pp. 1-56.

Thorndike, A.S., D.A. Rothrock, G.A. Maykut, and R. Colony, 1975: The Thickness Distribution of Sea Ice. Journal of Geophysical Research, vol. 80, No. 33, pp. 4501-4513.

Metzger, E.J., O.M. Smedstad, P. Thoppil, H.E. Hurlburt, D.S. Franklin, G. Peggion, J.F. Shriver T.L. Townsend and A.J. Wallcraft, 2010: Validation Test Report for the Global Ocean Forecast System V3.0-1/12° HYCOM/NCODA: Phase II. NRL Memo. Report, NRL/MR/7320-10-9236.

Lindsay, R.W. and H.L. Stern, 2003: The RADARSAT Geophysical Processor System: Quality of Sea Ice Trajectory and Deformation Estimates. Journal of Oceanic and Atmospheric Technology, vol. 20, pp. 1333-1347.

Lipscomb, W.H., E.C. Hunke, W. Maslowski, and J. Jakacki, 2007: Ridging, strength, and stability in high-resolution sea ice models, Journal of Geophysical Research, vol. 112, C03S91, pp. 1848-1865.

Helfrich, S., 2012: Operational Evaluation Report for the Arctic Cap Nowcast/Forecast System (ACNFS), Naval Ice Center (NAVICECEN), pp. 1-55.

Hogan, T.F., T.E. Rosmond, and R. Gelaro, 1991: The description of the Navy Operational Global Atmospheric Prediction System's Forecast model (NOGAPS), NOARL Report 13, pp. 1-218.

Posey, P.G, E.J. Metzger, A.J. Wallcraft, R.H. Preller, O.M. Smedstad, M.W. Phelps, 2010: Validation of the 1/12° Arctic Cap Nowcast/Forecast System (ACNFS). NRL/MR/7320—10-9287, pp. 1-61.

Metzger, E.J., A.J. Wallcraft, P.G. Posey, O.M. Smedstad, and D.S. Franklin, 2013: The Switchover from NOGAPS to NAVGEM 1.1 Atmospheric Forcing in GOFS and ACNFS. NRL/MR/7320—13,9486, pp. 1-17.

Martin, Seelye, 2001:Polynyas. In Encyclopedia of Ocean Sciences, ed. Steele, J.H., Turekian, K.K., Thorpe, S.A., vol. 3, pp. 2241-2247.

NASA Earth Observing System Data and Information System, Rapid Response, 2014: MODIS Aqua Arctic mosaic imagery, https://earthdata.nasa.gov/earth-observation-data/near-real-time/rapid-response.

* cited by examiner

|  | Fracture Regions | | | Percent of Fracture Regions | | | | | | |
|---|---|---|---|---|---|---|---|---|---|---|
|  | ✓ | ? | X | ✓ | off-set | partial | subset | weak | ? | ✓+? | X |
| ACNFS opening rate | 49 | 89 | 18 | 31% | 5% | 21% | 22% | 9% | 57% | 88% | 12% |
| GOFS opening rate* | 42 | 85 | 33 | 26% | 4% | 21% | 18% | 10% | 53% | 79% | 21% |
| ACNFS accumulated openings | 67 | 95 | 6 | 40% | 3% | 10% | 40% | 4% | 57% | 97% | 4% |

TABLE 1: FLAP area prediction comparison categories totals. "✓" indicate a strong match; "?" indicates a match to some degree, and "X" indicates a poor match. "?" is broken down further into off-set location, partial area match, subset of area matched, and weak openings in area. (*GOFS best quality is a 1-day hindcast.)

FIG. 38

LEADS AND POLYNYAS FORECASTING

CROSS-REFERENCE TO RELATED APPLICATIONS

This Application is a non-provisional application claiming priority to provisional application 62/313,475 filed on Mar. 25, 2016, under 35 USC 119(e). The entire disclosure of the provisional application is incorporated herein by reference.

BACKGROUND

Sea ice is not uniform but rather includes dynamic features such as polynyas and leads. A polynya is an area of open water that is expected to have sea ice (i.e., is surrounded by sea ice). The area of a polynya remains open because mechanisms, sensible-heat or latent-heat, prevent sea ice from forming or quickly remove it. A lead is a narrow, linear crack that is formed to relieve stress as ice flows diverge. The open water resulting from polynyas and leads is important for marine navigation.

The National Ice Center (NIC) produces a Fractures/Leads and Polynyas (FLAP) product, which is a formatted text message that identifies navigation and surfaceable features in the ice over large areas. The messages contains the latitude/longitude pairs delineating FLAPs, as well as remarks on the orientation, and ice types that a NIC ice analyst generated from available imagery. FLAP messages are produced for non-routine, special operations and exercises (submarine and surface ships) disseminated via message traffic and Submarine Forces broadcast. FIG. 1 shows a notional example of a FLAP message built from Moderate Resolution Imaging Spectroradiometer (MODIS) imagery and the corresponding Arctic Cap Nowcast/Forecast System (ACNFS) opening rate product.

SUMMARY

Embodiments relate to leads and polynyas forecasting. Initially observed ice forecast data is obtained for a geographic area of interest, which is then used to generate an ice grid based on the observed ice data, where the ice grid includes grid cells that map polar regions. At this stage, daily opening rates are determined based on the ice grid, where each daily opening rate indicates an opening speed of a corresponding ice event, and daily convergence strain rates are determined based on the ice grid, where each daily convergence strain rate indicates a convergence of the corresponding ice event. For each day, a daily opening rate is weighted and then adjusting by a daily convergence strain rate. A forecasted opening rate on a target date is determined based on the weighted, adjusted daily opening rates. Predicted openings of the polar region can be rendered based on the forecasted opening rate.

In some embodiments, the opening rate is smoothed and contoured for each of the grid cells. The predicted openings may be rendered with a reasonable scales limit that is in a range of about 0% to 15% per day. The predicted openings may be rendered with a minimum opening rate of about 0% to 1% per day. In some cases, the date range for the embodiments can be from three to seven sequential days.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 38 shows TABLE 1.

DESCRIPTION

Arctic Cap Nowcast/Forecast System (ACNFS) calculates motion rates (opening/closing, ridging, divergence, and shear) in addition to numerous other products such as ice concentration, ice thickness, and ice drift. The Naval Research Laboratory (NRL) ACNFS provides nowcast and forecast fields of ice parameters such as ice concentration, ice thickness, and ice drift which have been validated using observational data sets. ACNFS also provides ice motion strain rate fields of divergence, shear, and opening rate which can be used to provide an indication of zones of ice fracturing of leads and polynyas. A combination of these parameters is used by embodiments of the invention to produce a product of opening rates that represent areas of FLAPs.

A series of comparison studies are described below using ACNFS strain rate fields and then used to validate the opening rate products against an 11 month period of National Ice Center (NIC) FLAP messages from January through November 2012. Forecasted ACNFS fields are evaluated for the period of February through June 2014 on daily 24 hours through 7-day forecasts. Additional comparisons are shown for ICEX-2014. This validation assessment was performed using ACNFS with some limited comparisons with the Global Ocean Forecast System (GOFS 3.1). GOFS 3.1 uses the same ocean model coupling and sea ice model as ACNFS and is expected to perform similarly. Overall, ACNFS along with GOFS 3.1 provided a reasonable prediction of the openings not available elsewhere in the both nowcast and forecast mode and performed better than persistence.

Figure 1:
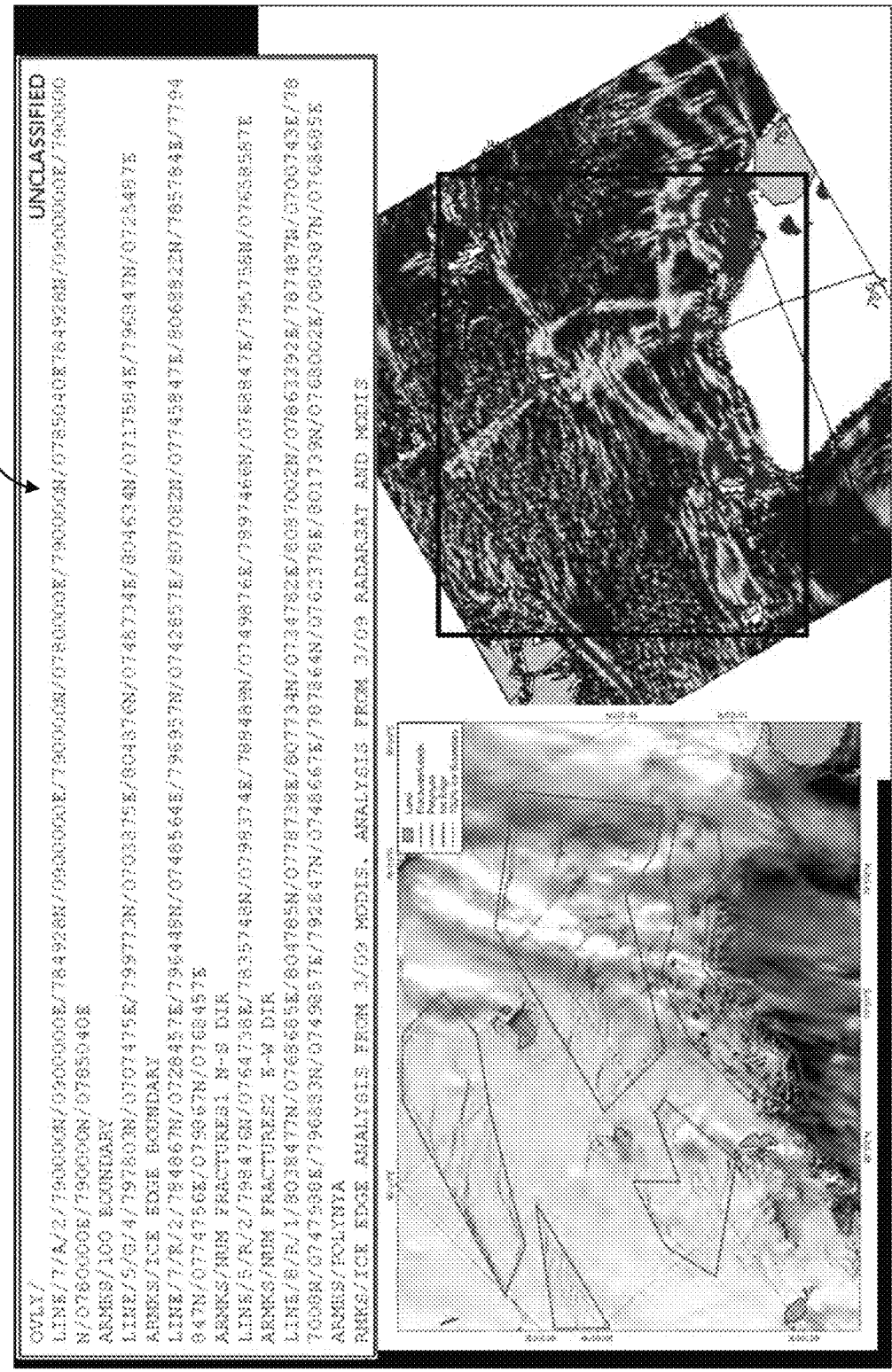
FIG. 1 shows examples of various sea ice products.

FIG. 1 shows examples of various sea ice products. Specifically, notional FLAP message 102 for Arctic region north of Kara Sea is shown with textual descriptions of sea ice features. On the lower-left, MODIS imagery 104 is shown with fracture poly-lines in green, polynya in magenta, and ice edge in red. On the lower-right, ACNFS opening rate 106 valid for the same time period is shown.

A utilization study of ACNFS 106 was performed beyond its objective testing of ice concentration, thickness and drifts to compare ACNFS lead opening rate 106 to the daily NIC analysis. The ACNFS opening rate 106 was rated showing "good" potential for ice charting and as "very good" potential for FLAP 102 and annotated imagery special support generation. The NIC limited comparisons showed that the ACNFS 106 provided a general understanding for regional potential formation of leads, but was less able to resolve actual location and orientation. Also noted in the NIC operational evaluation was the importance in forecasting lead openings.

Initial comparisons of ACNFS 106 and MODIS imagery 104 studies were similar to NIC findings. Whereas the scale of the imagery was between 250 m and 1 km and often a mosaic of imagery; the scale of ACNFS 106 is approximately 3.5 km. While the ACNFS opening rate products 106 looked realistic, they rarely matched the fracture-to-fractures details in the satellite imagery. Given the dynamic nature, temporal and spatial scales, and the model ice rheology, individual fracture of opening grid cells are not expected to be resolved. The model did well depicting relative regions of fractures which are similar to the FLAP areas identified by the NIC FLAP messages. As discussed below, the model does well capturing the fracture field on this scale.

Below a series of comparison studies performed using ACNFS strain rate fields are described. In particular, the opening rate and openings based on an accumulation of opening fields are discussed. ACNFS opening rate 106 products were validated against an 11 month period of FLAP messages 102 from January through November 2012. The FLAP messages provided reference data to validate the best quality two-day hindcast ACNFS model output. Forecasted ACNFS fields are also evaluated for the period of February through June 2014 on daily 24 hour through 168 hour forecasts.

The ACNFS 106 consists of the Los Alamos Sea Ice Model, the Community Ice Code (CICE) coupled with the Hybrid Coordinate Ocean Model (HYCOM), with daily Special Sensor Microwave Imager/Sounder (SSMI/S) ice concentrations assimilated through Navy Coupled Ocean Data Assimilation (NCODA). Navy Operational Global Atmospheric Prediction System (NOGAPS) forcing was applied daily to ACNFS 106 prior to 13 Mar. 2013, after which forcing was replaced by the Navy Global Environmental Model (NAVGEM). The ACNFS 106 provides daily 7-day ice products forecasts at approximately a 3.5 km resolution.

Figure 2:
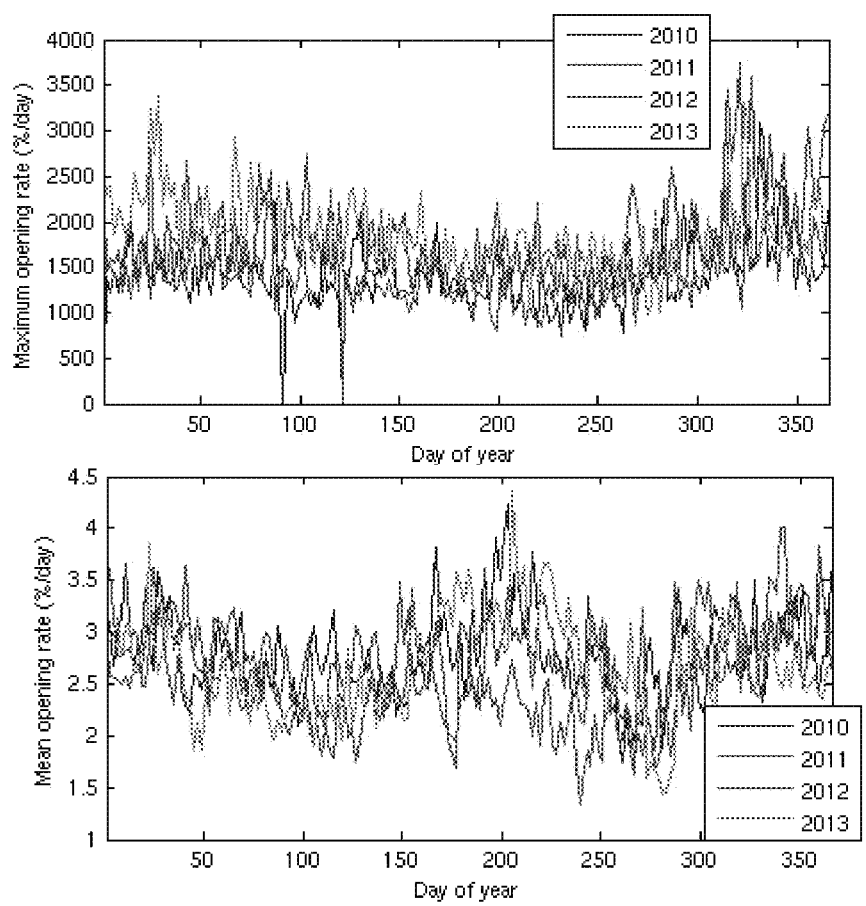
FIG. 2 shows example daily ACNFS opening rates.
Figure 3:
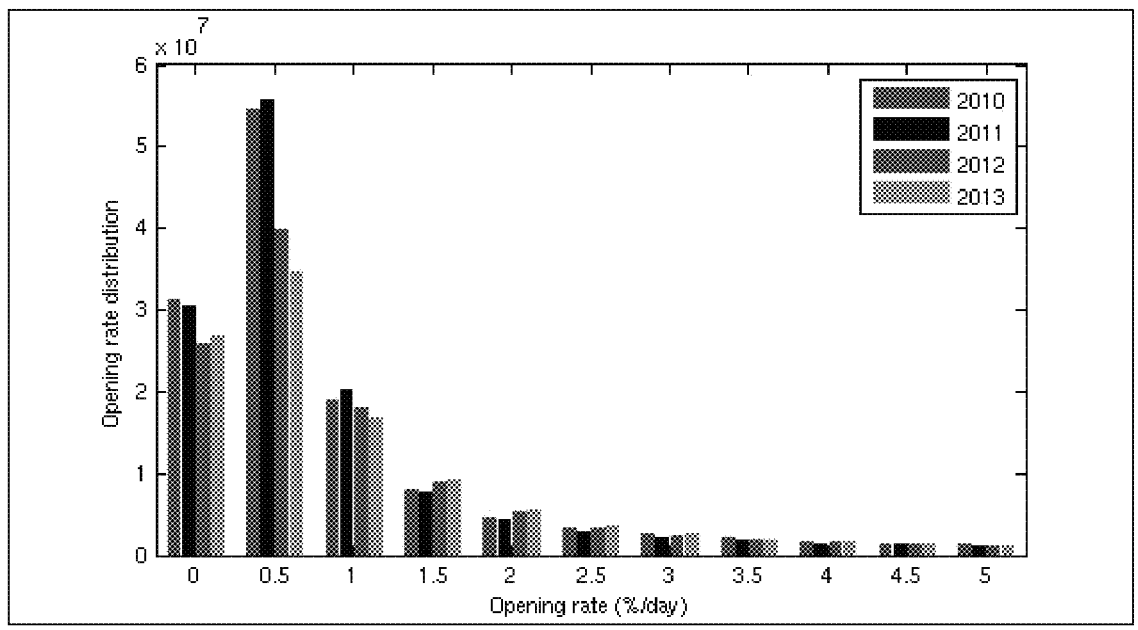
FIG. 3 shows the distribution of the opening rate values of FIG. 2.

CICE uses an elastic viscous plastic (EVP) ice rheology to describe the ice dynamics and compute strain rates. It incorporates a standard ridging scheme to compute the rates of opening, closing, and ridging given the strain rates. ACNFS 106 calculates the divergence (positive values are divergence, negative values convergence) and shear strain rates as well as the computed opening rate. The strains and opening rates are in units of %/day. Opening rate values vary greatly between 0 (no opening) to more than 1000%/day. Mean values however are on the order of 3%/day, with most values below. FIG. 2 shows the maximum and mean of the daily ACNFS opening rates for the time period of 2010 through 2013. FIG. 3 shows the distribution of the opening rate values for the same period.

Figure 4:
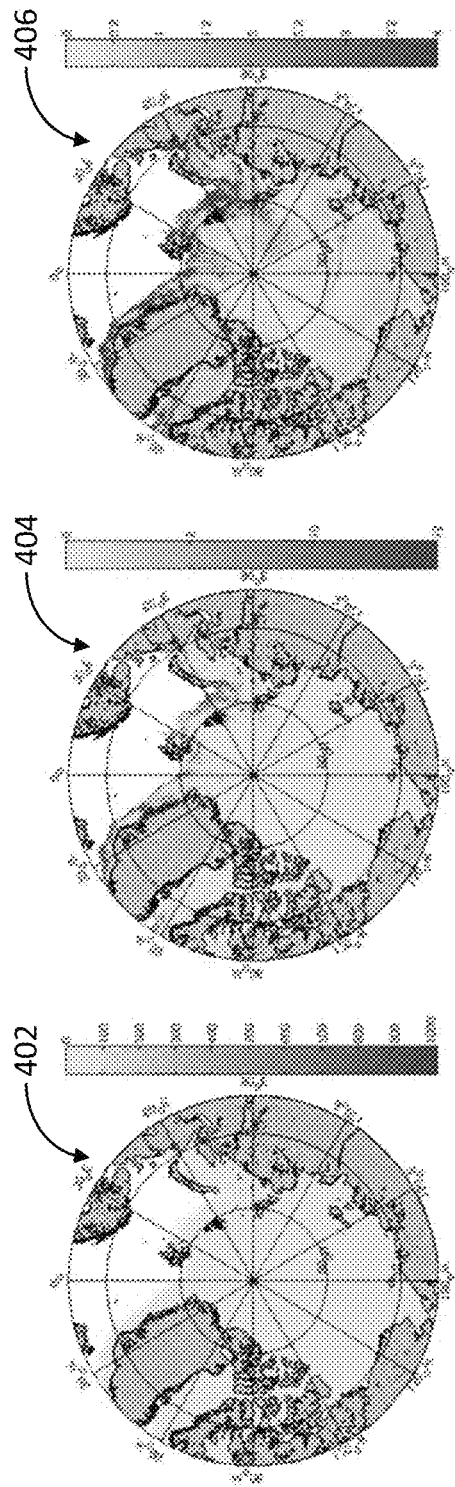
FIG. 4 shows the opening rate for a winter day.

FIG. 4 shows the opening rate for a winter day plotted with different color scales. Plot 402 shows the default color scaling of 0 to ~1000%/day. By using this larger color scale, the openings are not easy to identify showing no openings with only a slight hint of color in the Denmark Strait. Plot 404 shows that by reducing the scale closer to the average values (0-15%/day), yields delineated fracture-like features. Plot 406 shows a scale of 0 to 4%/day that was used for most visualization of the opening rates.

Figure 5:
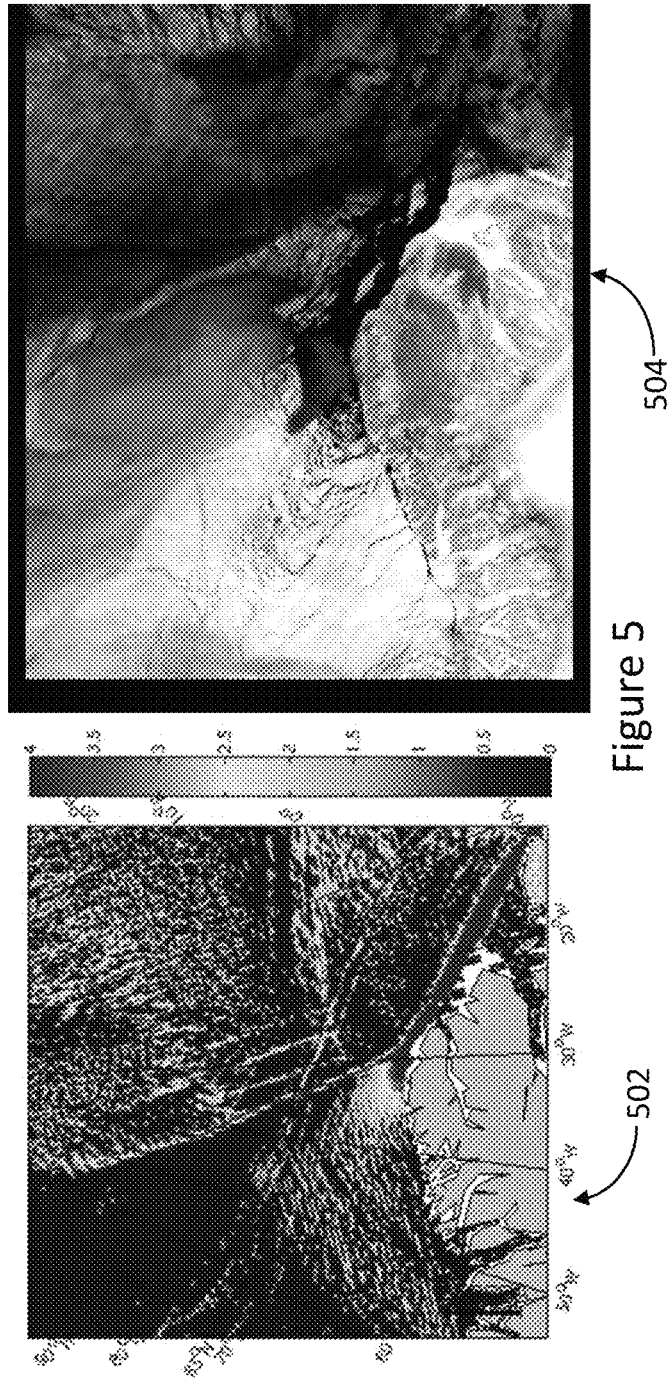
FIG. 5 shows an example of a typical ACNFS opening rate product.

In preliminary comparisons, the ACNFS opening rate field looked reasonable with features often resembling satellite imagery. FIG. 5 shows an example of a typical ACNFS opening rate product 502 illustrating realistic fractures as compared to satellite imagery 504.

The daily ACNFS model 502 opening rate is an instantaneous value. It provides an indication of how fast an opening event occurs with a unit of percent per day. Unlike imagery 504, which shows openings that are present, an opening rate is an indication of new or expanding fracturing. The opening rate field does not reflect ice openings from previous days, unless they are expanding or are large enough to be seen in the ice concentration.

For exercise/operations planning and forecasting, knowledge of the timing and location(s) of significant fracturing expected to occur is important. However, for daily surface ship and submarine navigation and surfacing, knowledge of where openings are present or expected is important. To simulate the existing openings and the leads that are opening, an accumulation of opening over the course of a few days is computed. This model does not determine a closing rate, but it does produce a convergence, which is closely related. A more comparable model product can be produced by maintaining the previous 3 days of openings from the time of interest, with opening rates being weighted to dampen their influence relative to the temporal distance to the time of interest and then applying any convergence.

The openings for a day of interest, d, can be computed for each grid cell in a sea ice model separately as:

$$O_d = \max\{\omega_d \varepsilon_{A_{d-1}} - \varepsilon_{D_d} \varepsilon_{O_d}\}. \tag{1}$$

Where $\varepsilon_A$ is the accumulated opening from the previous day and given by the recursive formula:

$$\varepsilon_{A_i} = \max\{\omega_i \varepsilon_{A_{i-1}} - \varepsilon_{D_i}, \varepsilon_{O_i}\}, \quad (1)$$

Where i is the day past from the day of interest, $\varepsilon_O$ is the opening rate, $\varepsilon_D$ is the convergence strain rate, and $\omega_i$ is the damping weight applied to the daily opening rate. Expanding Equation 1 for a three day accumulation yields:

$$O_d = \max\{\max\{\max\{\omega_{d-3}\varepsilon_{A_{d-3}} - \varepsilon_{D_{d-2}}, \omega_{d-2}\varepsilon_{A_{d-2}}\} - \varepsilon_{D_{d-1}}, \omega_{d-1}\varepsilon_{A_{d-1}}\} - \varepsilon_{D_d}, \varepsilon_{A_d}\}. \quad (2)$$

Figure 6:
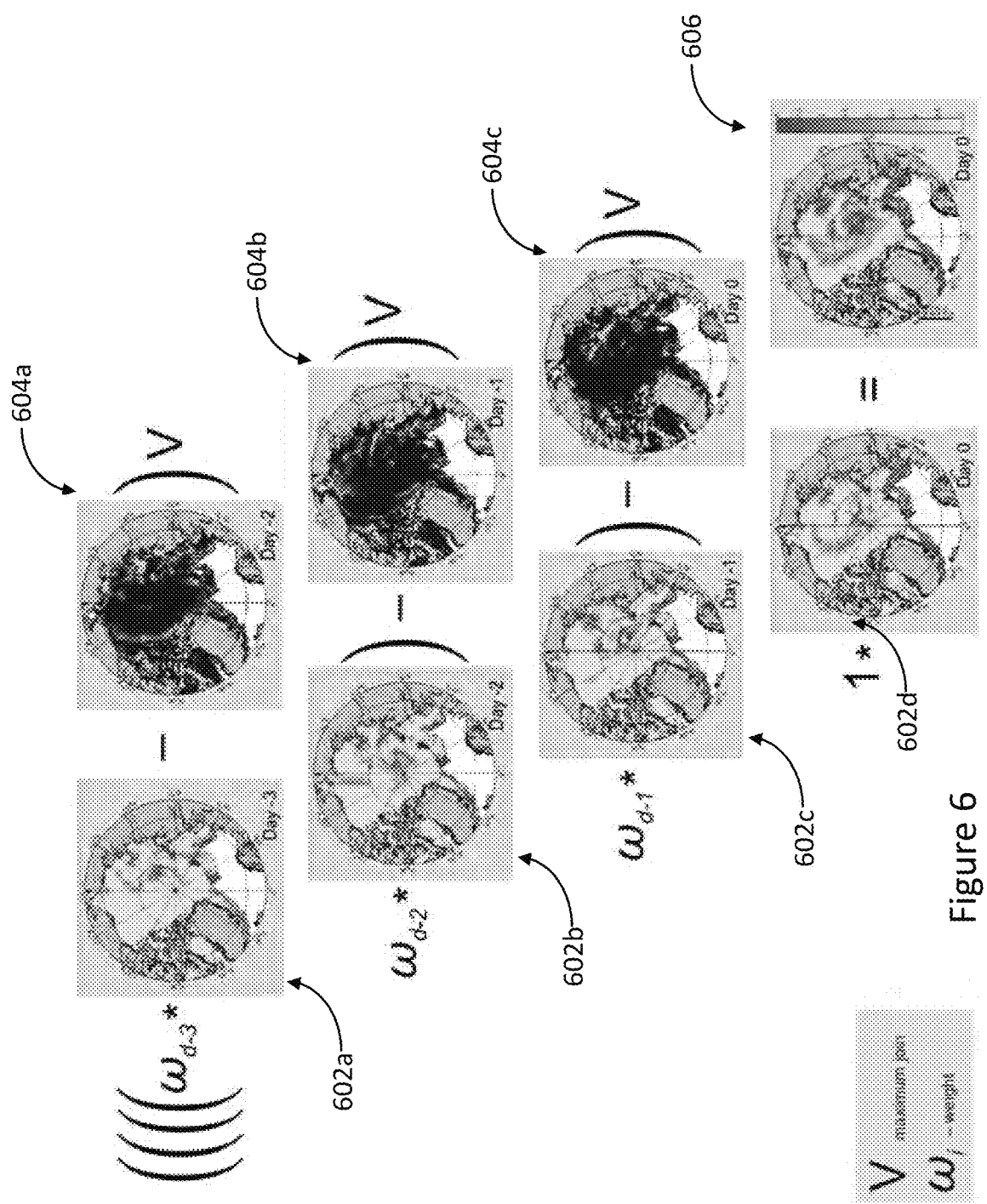
FIG. 6 illustrates an equation for a three day accumulation of openings.

FIG. 6 illustrates Equation 3 for a three day accumulation of openings on a basin-wide scale. The convergence rate of each day 604a, 604b, 604c is subtracted from the weighted opening rate of the day 602a, 602b, 602c, respectively and maximum joined incrementally with 602d to determine the accumulated openings 606.

Figure 7:
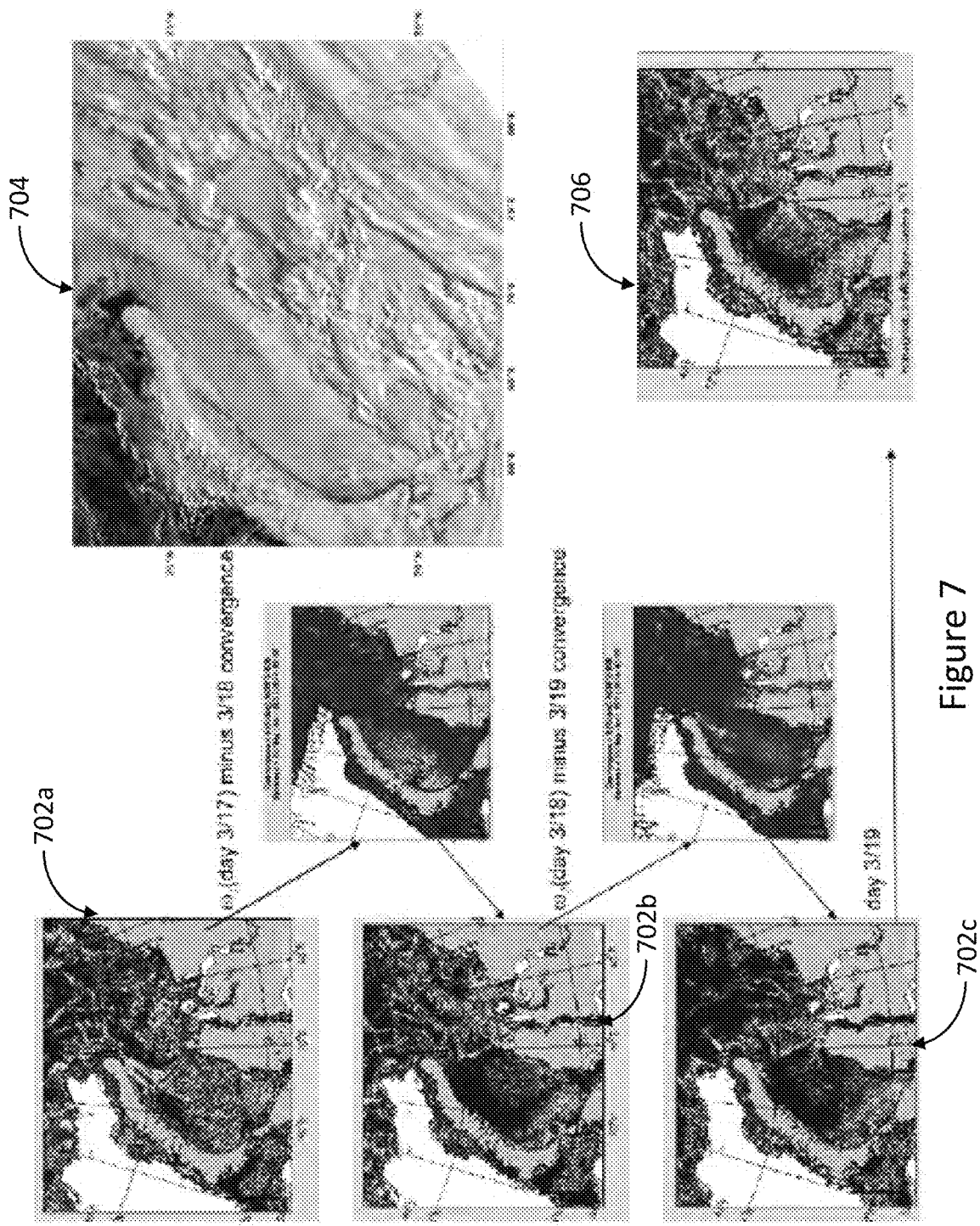
FIG. 7 illustrates a two day accumulation of openings.

FIG. 7 illustrates a two day accumulation 706 of openings 702a, 702b, 702c on a regional scale accompanied with VIIRS imagery 704 for the valid day. Weights of $\omega_i = \{0.8, 0.6, 0.4, 0.2, 0\}$ were chosen for i=d to d−4 to reduce the influence of previous openings.

Figure 8:
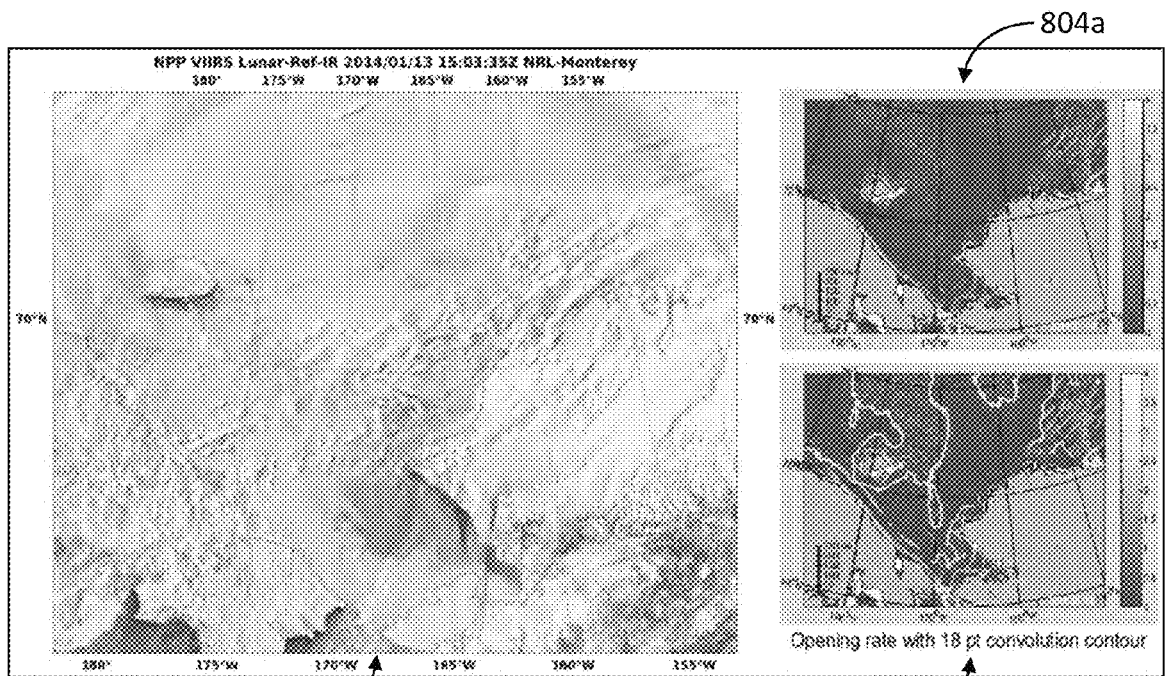
FIG. 8 illustrates contouring with an example of fractures in the Chukchi Sea.

To assist in the visualization of the fracture field and to provide methods of quantifying the results, the opening rate can be smoothed and contoured. With the ACNFS providing an indication of the general area of openings, rather than individual openings, bounding areas of fractures may yield more reliable results. To capture the area of fracturing on the scales of the FLAP message areas, the contour from an 18 point smoothing filter can be used. This contour provided the most consistent fracture grouping. FIG. 8 illustrates this contouring with an example of fractures 802 in the Chukchi Sea. The two model plots 804a, 804b on the right have the same opening rates plotted with contour overlaid on the lower plot 804b.

The ACNFS operational sea ice model is evaluated primarily on the basis of its ability to capture NIC identified FLAP. The NIC FLAP dataset consists of 81 FLAP messages from January 2012 through November 2012. The FLAP text messages delineate areas of openings in the ice on a tactical scale, hand-drawn by NIC ice analysts from available satellite imagery including Envisat and RADAR-SAT-2(SAR); and MODIS and DMSP/OLS (visible). The messages can cover a sub-region of the Arctic or can be basin wide. The messages contain coordinates of poly-line segments identifying fracture area polygons and polynya area polygons. If predominant, orientations of fractures and/or ice types are noted. In total, 227 fracture polygons and 37 polynya polygons are identified. Coordinates north of 82° were given in transpolar coordinates (where the North Pole (90/0) is centered instead at Greenwich Mean Time and the equator) and converted to standard Greenwich coordinates.

As discussed above with respect to FIG. 1, ACNFS consists of 3 components: 1) ice—CICE, 2) ocean—HYCOM and 3) data assimilation—NCODA. The model provides a daily 7-day forecast at approximately 3.5 km resolution. For the FLAP comparisons, the model output from the 2-day hindcast (best quality) is used. ACNFS opening rates are used as the primary source of comparison and are indicative of the amount of fracturing and lead distributions.

The CICE model has also been implemented into the Global Ocean Forecast System (GOFS3.1). GOFS 3.1 is comprised of the 1/12° global HYCOM and the NCODA system of which ACNFS domain is a subset and is likewise forced with NAVGEM atmospheric forcing out to 7 days.

GOFS 3.1 provides nowcasts and forecasts of the global ocean environment which includes three-dimensional ocean temperature, salinity and current structure, surface mixed layer, the location of mesoscale features, ice concentration, thickness and ice drift.

GOFS 3.1 has the capability to provide ice forecasts in the Southern Hemisphere as well as the Northern Hemisphere. GOFS 3.1 opening rate products have also been validated for leads and polynyas forecasting as described herein.

Figure 9:
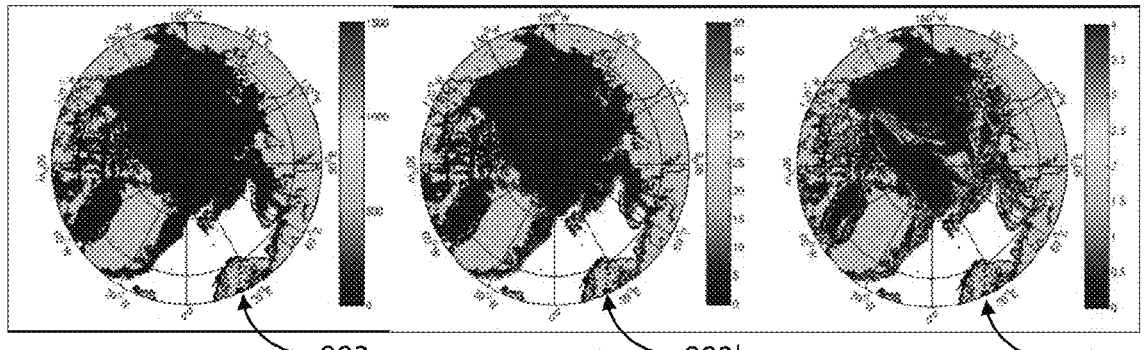
FIG. 9 shows the opening rate output for a typical Arctic day plotted at different scales.

Several thresholds were determined to best capture the fracture fields: 1) the scale in which to view the plots, 2) the minimum opening rate to consider an opening, and 3) the concentration in which to consider openings. As shown in FIG. 2, the maximum opening rate over the Arctic basin on any given day is between 1000 and 3000%/day, with extremely high opening rate values isolated generally near the ice edges. FIG. 9, similar to FIG. 4, shows the opening rate output for another typical Arctic day plotted at different scales. Plotted to the maximum for this day of 1510 %/day 902a, no fracturing is evident. When scaled to a much lower value of 50%/day 902b, only a few openings are seen along the ice edge. Ultimately at a scale from 0 to 4%/day 902c, the openings are easily viewable. Reasonable scales limits were shown to be between from 0 to 3-15%/day. The NIC and NRL agreed to use a scale from 0 to 4%/day for the opening rate validation.

Figure 10:
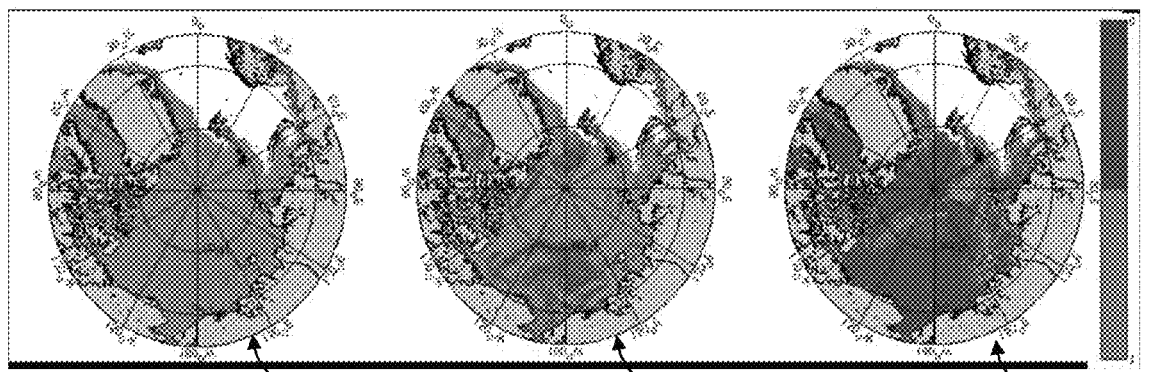
FIG. 10 illustrates the effects of a minimum opening rate.

Opening rate values have a minimum of 0%/day indicating no opening, but almost all grid cells have an opening rate component, even if extremely small. Choosing a minimum as any opening greater than 0 (or a small value) is not representative of the fracturing, as it implies fracturing throughout. A minimum opening rate of 1%/day was chosen as best mirroring fracture regions at the scale seen in imagery and in a typical FLAP messages. FIG. 10 illustrates the consequences of the minimum opening rate. Cells are colored green for opening rates greater than the threshold and cells are colored red for opening rates less than the threshold. The left plot 1002a has a minimum threshold of 0.1%/day. Only a few isolated cells have values less than the minimum. The middle plot 1002b has a minimum threshold of 0.5%/day. Some opening structure is becoming visible, but it is still not a reasonable indication of actual ice openings. The right plot 1002c shows a minimum threshold of 1%/day.

The operational ACNFS (run at 18Z) produces a daily nowcast and 7 day forecast at time 00Z from the previous day's 24 hour restart file. Every day the system reaches back 72 hours from the nowcast time (18Z) to use any late arriving satellite data. As a result, ACNFS produces three hindcasts: time 00Z on the model run day, a 1-day hindcast, and a 2-day hindcast. The 2-day best quality hindcast is considered the model's best representation of the actual ice conditions and is used in the comparison against the FLAP messages.

Ice openings were examined through an initial qualitative analysis comparing distributions of areas of ACNFS opening rates and FLAP messages. For each message, the number of fractures and polynyas along with the density and orientation noted and the satellite imagery used in the analysis were listed. Comparison metrics were compiled for each message fracture area noting the model agreement category as strong match, partially covered, location off, subset of field, or no match. TABLE 1 below presents the summary statistics comparison categories totals. The first three columns are the gross number of fracture regions identified in the FLAP messages that went into the statistics. The rest of the columns are percentages of the fracture regions. Matches are classified as strong ("√"), meaning the model contained fracturing in the same location as the FLAP message polygon; to some degree ("?"), broken down further into off-set location, partial area match, subset of area matched, and weak openings in area; and poor match ("x"). The "√/?" column is the sum of the strong and to some degree columns. The metrics suggest that the ACNFS accumulated openings were an improvement over the instantaneous opening rate and that ACNFS and GOFS3.1 performed similarly. In all cases, the models did well, capturing between 88-97% of the FLAP fracture regions, with ~30% as a strong match. Using the accumulated openings improved the miss-rate considerably. FIG. 38 shows TABLE 1.

There are intrinsic limitations in the assessment of the model performance against the FLAP messages. The polylines in the messages are subjective, hand drawn borders made by different analysts, under different circumstances, with different and unknown intelligence/tactical needs, and with different and unknown source imagery. If a model opening area is not included in a FLAP message, there is no way to know whether or not it exists. In the absence of consistently clear imagery or other ground truth data, the FLAP messages are the best validation data.

Some publicly available basin-wide RADARSAT-1 data transformed into estimates of ice motion and deformation by NASA's RADARSAT Geophysical Processor System (RGPS) coincides with available ACNFS runs. The RGPS and ACNFS products are available during winter.

Figure 11:
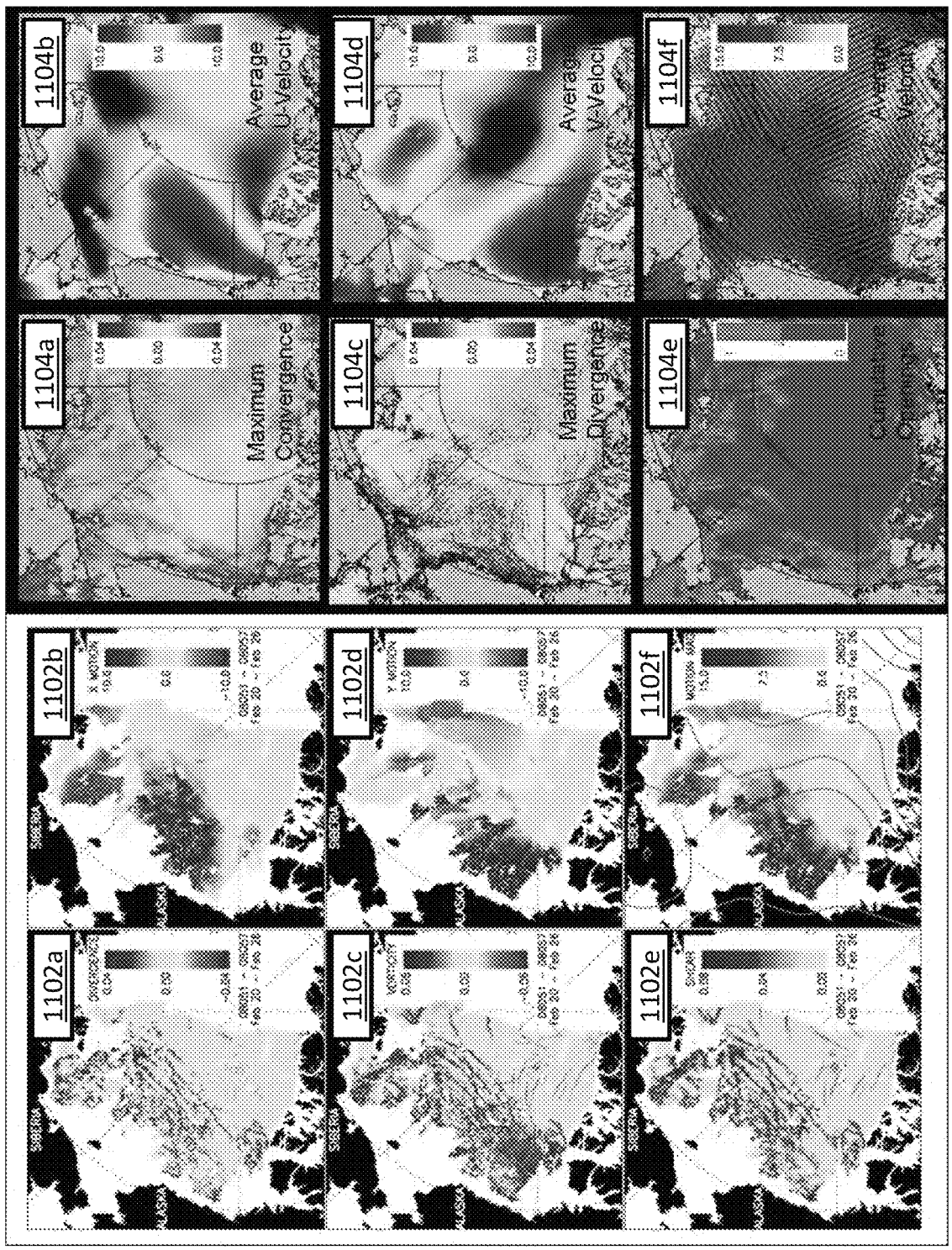
FIG. 11 shows deformation and velocity fields from RADARSAT processing system and the ACNFS model fields.

The RGPS deformation fields were generated over weekly time periods rather than daily. To compare the daily model output with the weekly data, the ACNFS output strain rates (opening rate, divergence, and convergence) were accumulated over the weekly time period to capture all openings (closings). Ice drift u- and v-components along with a calculated magnitude were averaged over the time period. Typical results are shown in FIG. 11, with the model indicating openings in the same general areas as the RADARSAT divergence, but without the same structures. In FIG. 11, Feb. 20 to Feb. 26, 2008 deformation and velocity fields from RADARSAT processing system 1102a-1102f and the ACNFS model fields 1104a-1104f are shown. Panels indicate the following: RADARSAT: divergence (+)/convergence (−) 1102a, u-component velocity 1102b, vorticity 1102c, v-component velocity 1102d, shear 1102e, and ice drift magnitude 1102f ACNFS: maximum convergence 1104a, average u-component velocity 1104b, maximum divergence 1104c, average v-component velocity 1104d, cumulative opening 1104e, and average ice drift velocity 1104f.

Below is a discussion of how well ACNFS performed in capturing the known ice openings in forecasting the opening rate out for 7 days. The forecast validation covers the period of February 2014-July 2014. The forecasts were validated on a full Arctic scale against reference 2-day hindcasts and compared with persistence. On a regional scale, the model was compared against events of the Commander, Submarine Forces (COMSUBFOR) ICEX 2014 exercise.

The validation shows that the ACNFS forecasts provide value added over persistence even out to 6 day, performing particularly well in the first 24 to 48 hours, and then degrading out through the 7 days.

In the absence of ground truth data (no FLAP messages) during the time period that model forecasts were available, the ACNFS 2-day hindcasts were used as the reference data for the model forecasts. The 2-day hindcast is considered the model's best representation of the true ice conditions.

In determining the forecast skill for ACNFS opening rates, several weeks of forecasts over several months were examined, both on the full Arctic and regional scales.

Figure 12:
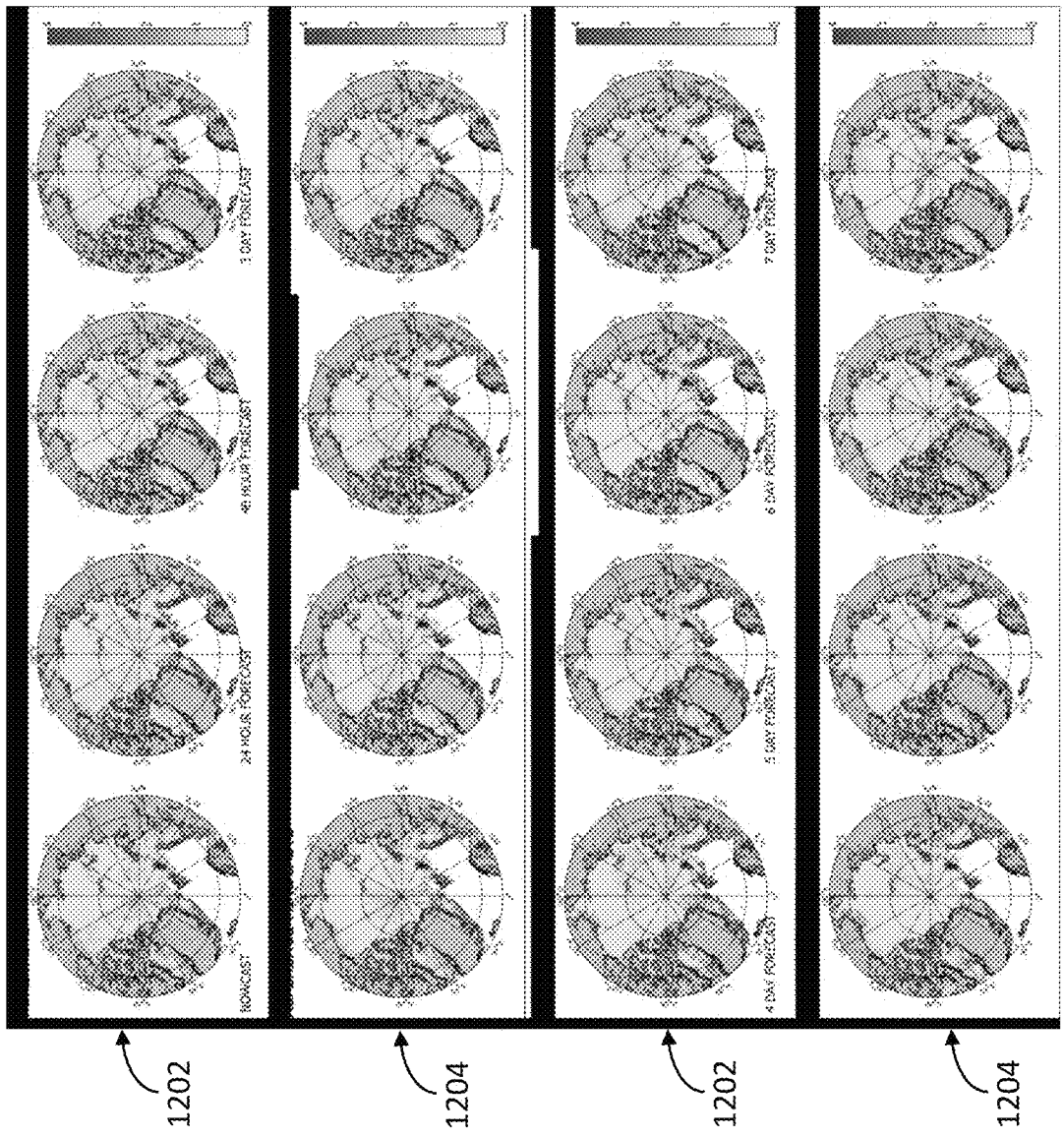
FIG. 12 shows a sample 7-day forecast of opening rate.
Figure 13:
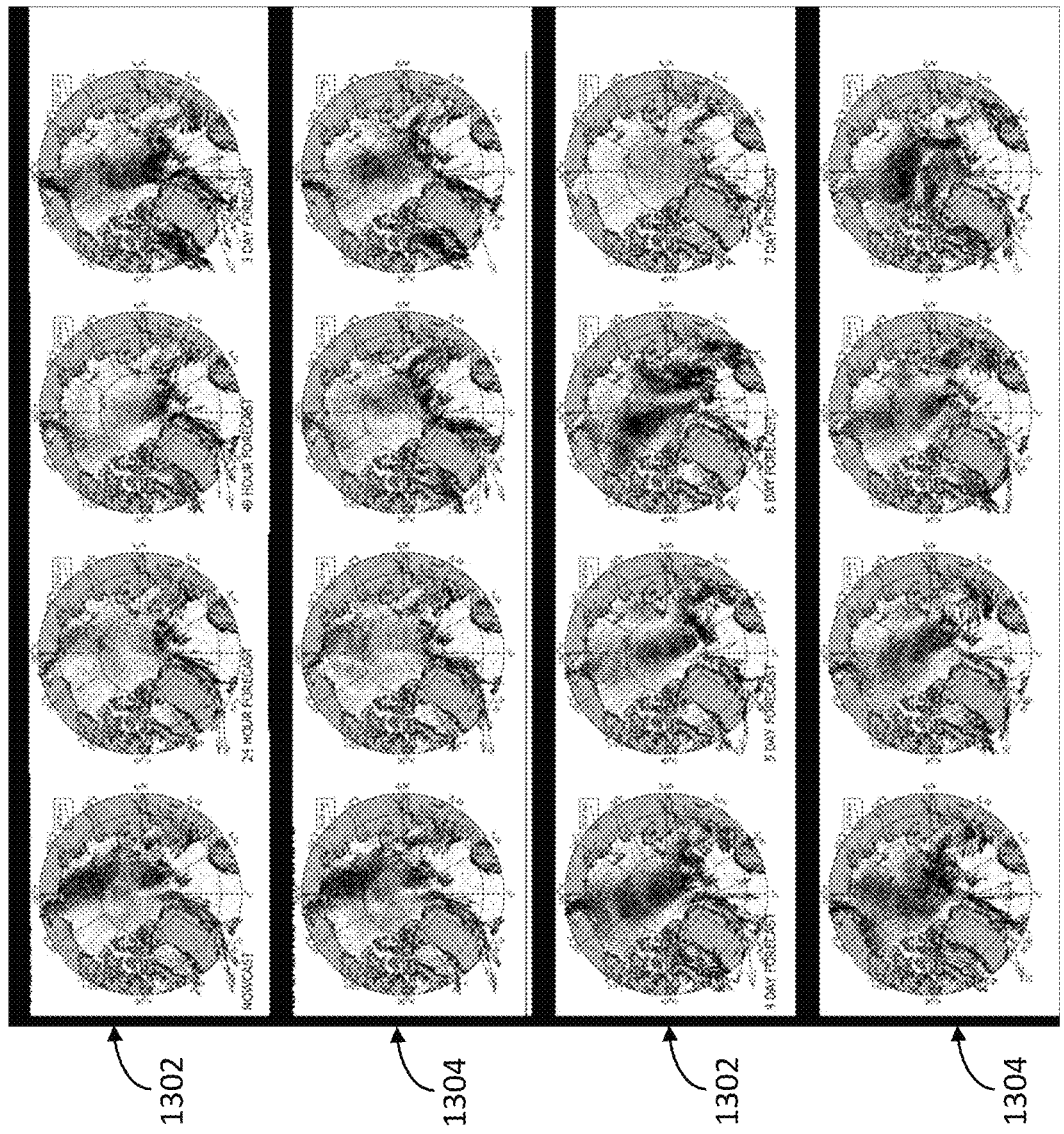
FIG. 13 shows a sample 7-day forecasts of ice drift.

FIG. 12 shows a sample 7-day forecast of opening rate for the second week in February 2014. The reference hindcasts 1204 are shown directly below the forecasts 1202. The model does extremely well through the first 24 hour forecast and still very well out through 4 days. By the $7^{th}$ day, the model forecasted opening rate product has degraded. FIG. 13 shows 7-day forecasts 1302 of ice drift above their corresponding hindcasts 1304. The same trend is clearly seen in the ice drifts, with the $7^{th}$ day drift being drastically different. The $7^{th}$ forecast day was often inconsistent due to the model $7^{th}$ day forcing not being available at run-time. In this case, the model reverts to climatological forcing.

Figure 14:
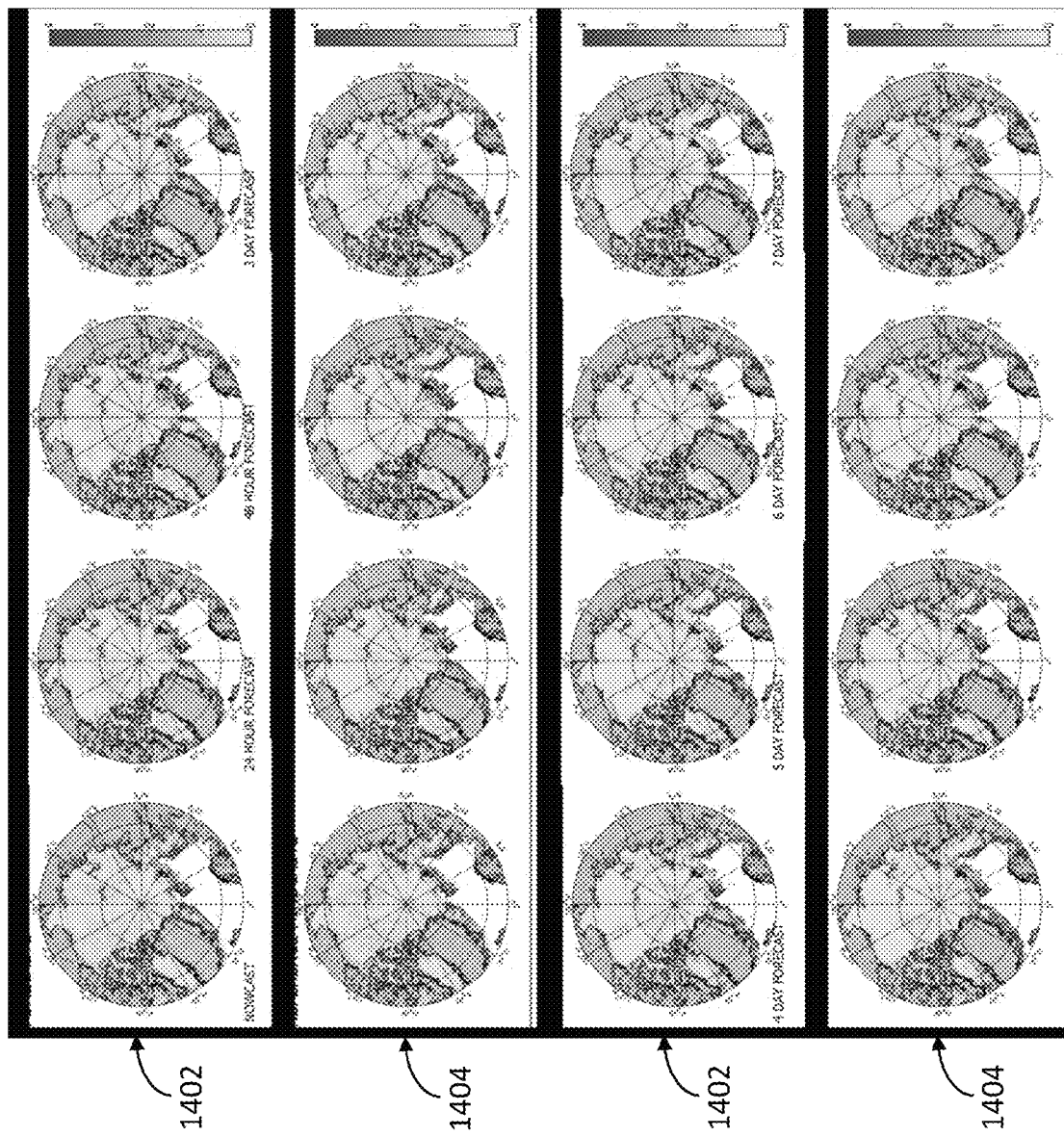
FIG. 14 shows a sample 7-day forecast of opening rate.
Figure 15:
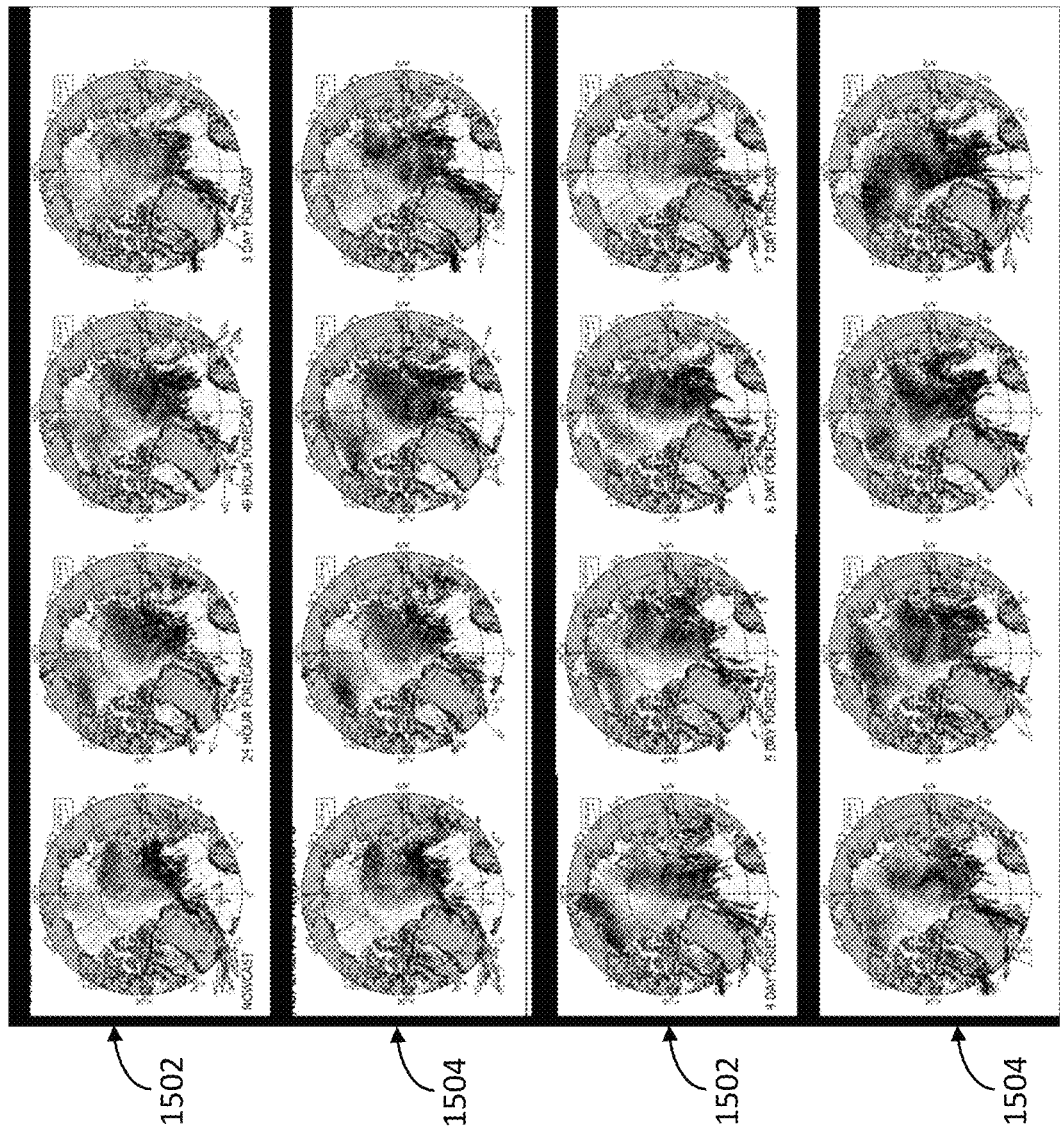
FIG. 15 shows a sample 7-day forecasts of ice drift.

FIG. 14 show the forecast for a month later in March 2014. Again, the forecasts 1402 are shown directly above the hindcasts 1404. In this case, the model does extremely well out through 4 days and very well out though the $6^{th}$. As with the previous example, by the $7^{th}$ day, the model did not do well. The corresponding ice drifts are shown in FIG. 15, where the forecasts 1502 are shown directly above the hindcasts 1504. The ice drifts were well captured out through 5 days.

Figure 16:
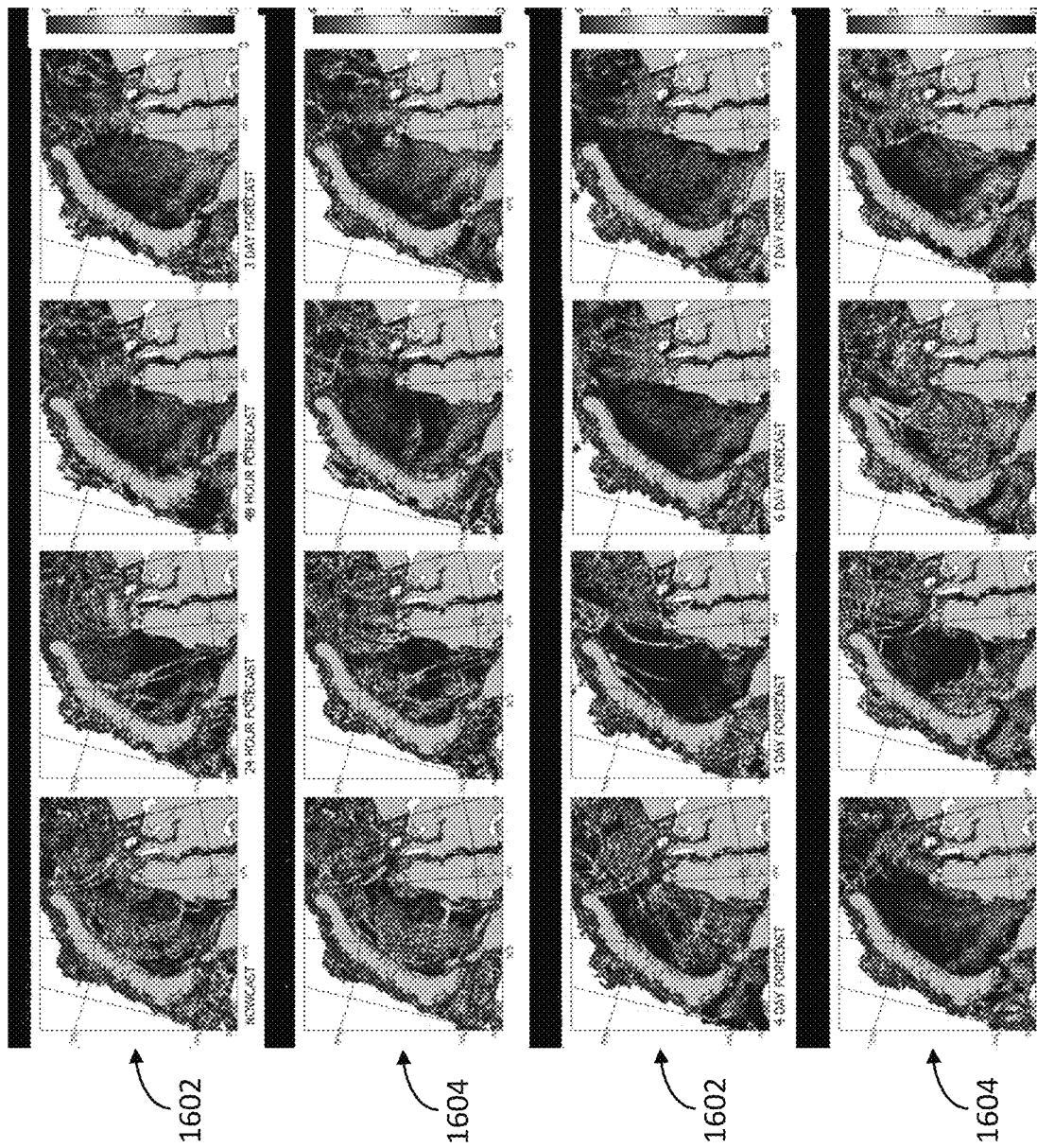
FIG. 16 shows an opening rate forecast that is zoomed into the Kara Sea region.
Figure 17:
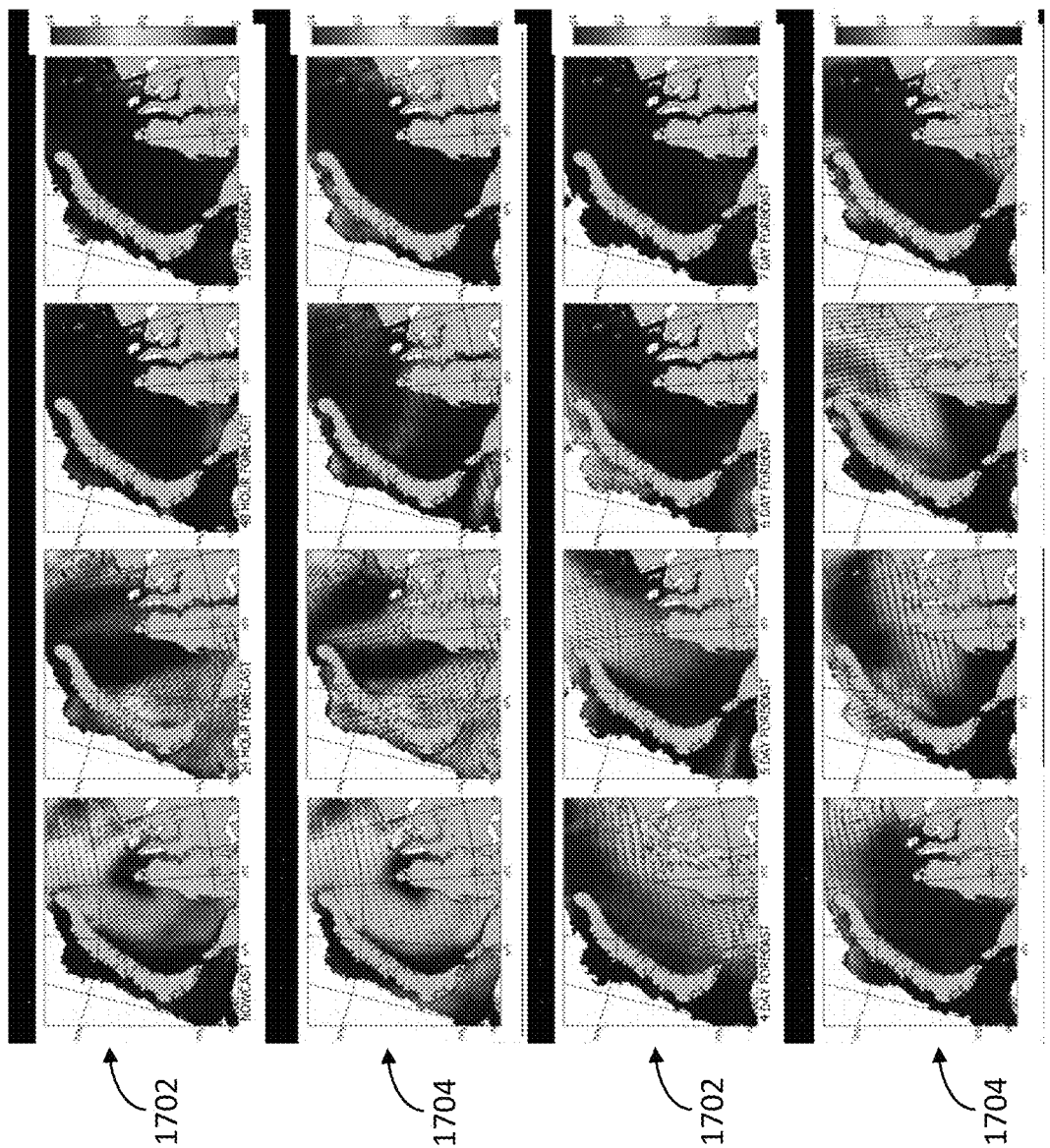
FIG. 17 shows an air stress forecast that is zoomed into the Kara Sea region.

Examining ACNFS on a smaller scale, FIG. 16 zooms into the Kara Sea region where more fracture details can be seen and differences are more visible, where forecasts 1602 for the region are shown directly above the hindcasts 1604. The model did very well out to 3 days, but for the 4-7 day forecasts, the model forecast did not do as well. By the 7th day the model picked the fracturing back up. The forecasted air stress plots 1702 shown in FIG. 17 directly above their corresponding hindcasts 1704 reveal that the opening rate is off after 3 days because the air forcing was very different for the 4th through 7th forecast days.

The samples shown are typical forecasts and representative of the initial correlation and then gradual degradation of the forecast.

Figure 18:
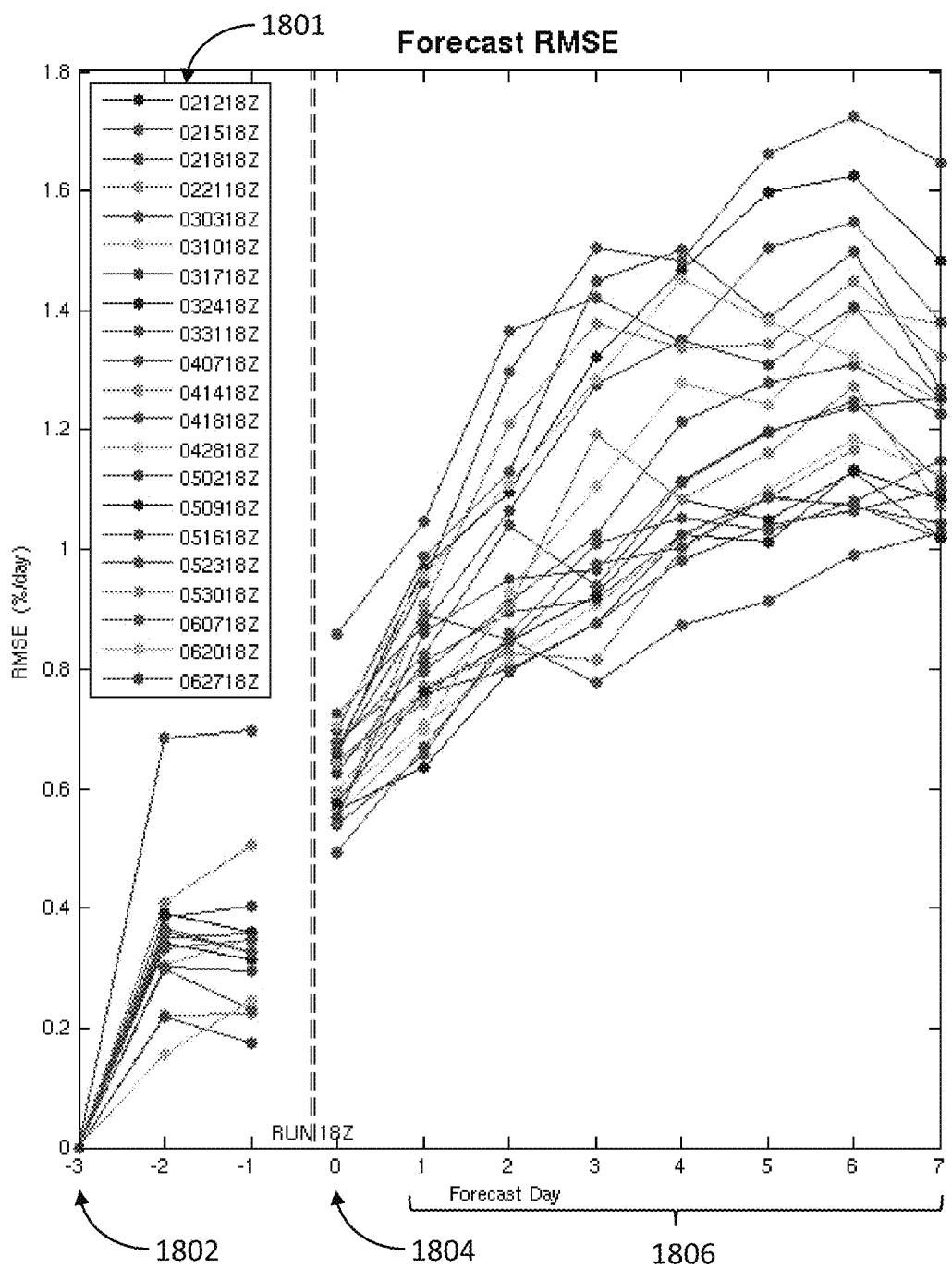
FIG. 18 shows the Root Mean Square Error (RMSE) computed for sample opening rate forecasts.

Validation is also performed by analyzing statistically the agreement between the forecasts and the reference hindcasts. The Root Mean Square Error (RMSE) was computed for the sample forecasts 1801 and is shown in FIG. 18. The hindcasts 1802 are included in the computations and are shown as negative forecast days. The reference hindcast is shown as −3 days 1802 with an error=0. The daily nowcast analyses are shown at day 0 1804 with the forecast days 1806 to the right. The forecast clearly performs better within a shorter forecast period and degrades with time. The RMSE growth rate is consistent between forecasts, with only a few exceptions and is highest between the nowcast and the 1-day forecast. After the 1-day, the forecasts have a decreasing slope, becoming flat by the $7^{th}$ day.

Since observed fracturing consists of the presence or absence of a fracture in an area, the accuracy is assessed by comparing the forecasts with a binary classification of opening and non-opening areas of the reference analysis for the forecast time. The comparison of reference and forecast model results classified into 2 classes is represented through contingency tables. TABLE 2 shows the contingency table used to score the forecast performance against the reference hindcast.

TABLE 2

Contingency table used for forecasting ice openings.

|  |  | Reference Standard | |
|---|---|---|---|
|  |  | Opening | Not Opening |
| Forecast | Opening | true positive | false positive |
|  | Not Opening | false negative | true negative |

Figure 19:
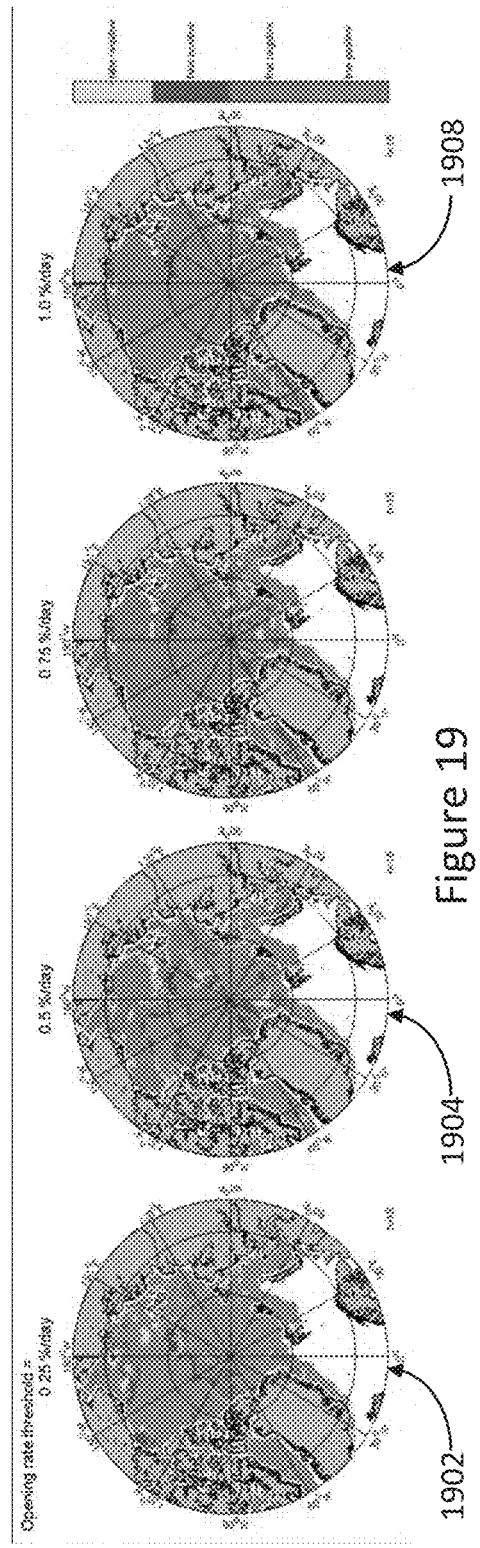
FIG. 19 shows contingency thresholds for opening rate values.

To reduce the opening rate values to an opening/non-openings classification, a cut-off value is needed. As discussed above with respect to TABLE 1, the model is used to provide an area of openings rather than openings for individual grid cells. To closely match the scale of the fracture areas in the FLAP messages, the same smoothing that was applied to capture the fracture fields is used in the contingency metrics. After experimenting with filters and cut-off values, a cut-off opening rate value of 0.5%/day applied after the 18 point smoothing filter was selected to best represent the FLAP contours. FIG. 19 shows thresholds for opening rate values that illustrate the effect of the cutoff value. The 0.25%/day threshold 1902 yields a basin almost entirely covered by fracture areas. On the other end, a 1.0%/day threshold 1908 yields a basin almost entirely void of fracture areas. A 0.5%/day threshold 1904 yielded the most reasonable fracture areas.

By combining correctly and incorrectly classified openings and non-openings, quality measures can be derived. To analyze ACNFSFLAP-like product capability, contingency plots were made and statistical quality metrics of their overall accuracy, sensitivity, and specificity accumulated:

Accuracy=(True Positive+True Negative)/All Positive and Negative.

Sensitivity=True Positive/(True Positive+False Negative).

Specificity=True Negative/(True Negative+False Positive).

Figure 20:
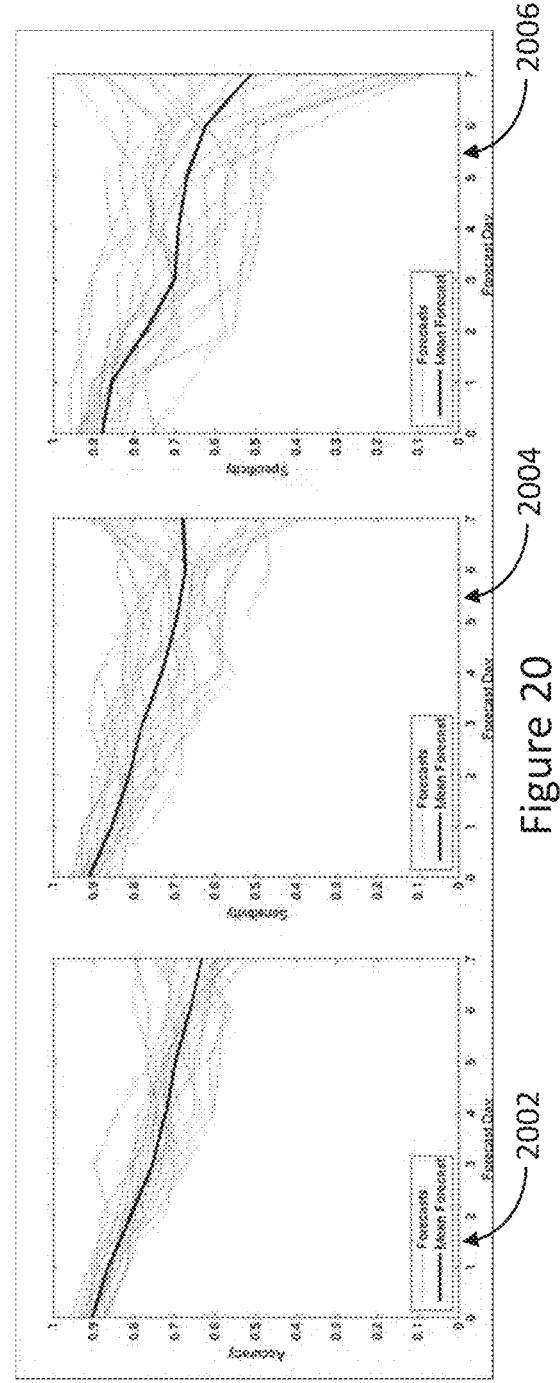
FIG. 20 shows quality metrics for forecasts.

Preliminary results (February through June 2014) show that the model does very well in the first 1-4 forecast days with generally over 80% sensitivity and then tapers off slowly from there as opposed to persistence which only has about 50% sensitivity for the 24 hours forecast. FIG. 20 plots the forecast contingency accuracy metrics out to 7 forecast days for the quality metrics for accuracy 2002, sensitivity 2004, and specificity 2006. Individual forecasts are shown in grey and the mean of the forecasts in black.

Sensitivity 2004 is a measure of how well a test was at detecting a condition. A high sensitivity in this context implies that the model did well predicting opening cells. The sensitivity 2004 is very high for the nowcast and drops off quickly, fairly linearly with each day further out. The often inconsistent $7^{th}$ forecast day is due to the model $7^{th}$ day forcing not being available at run-time. In this case, the model reverts to climatological forcing.

Specificity 2006 is a measure of how well a test correctly identifies the absence of a condition. A high specificity implies that the model did well predicting non-opening cells. The specificity 2006 is very high for the nowcast and 24 hour forecast and drops quickly for the next 48 hours. After that a slower drop-off in specificity 2006 is seen.

Figure 21:
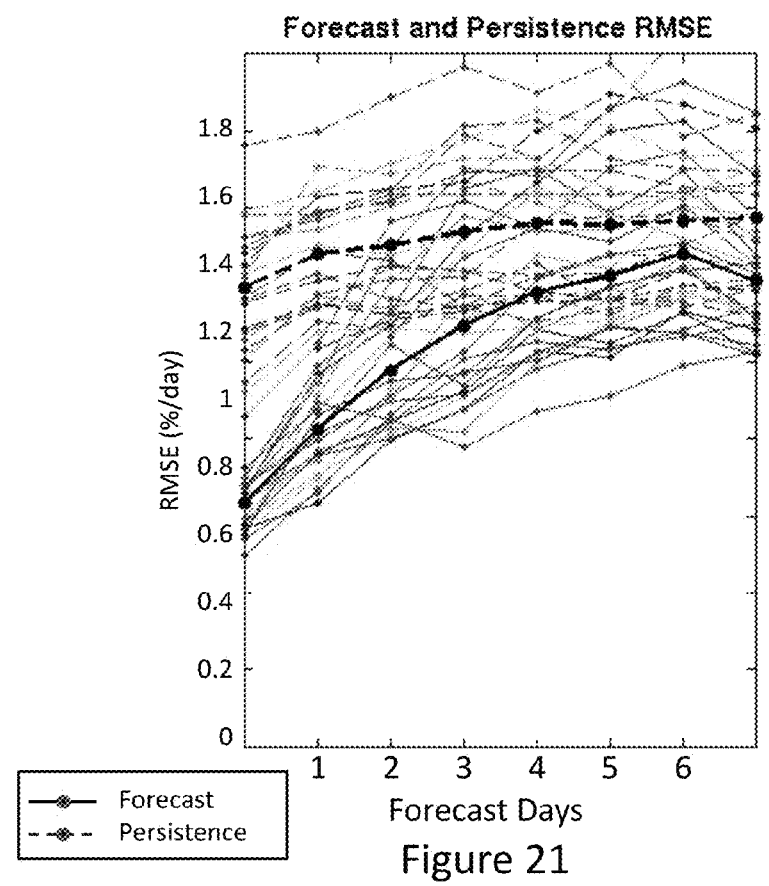
FIG. 21 illustrates the RMSE for individual forecasts relative to persistence.
Figure 22:
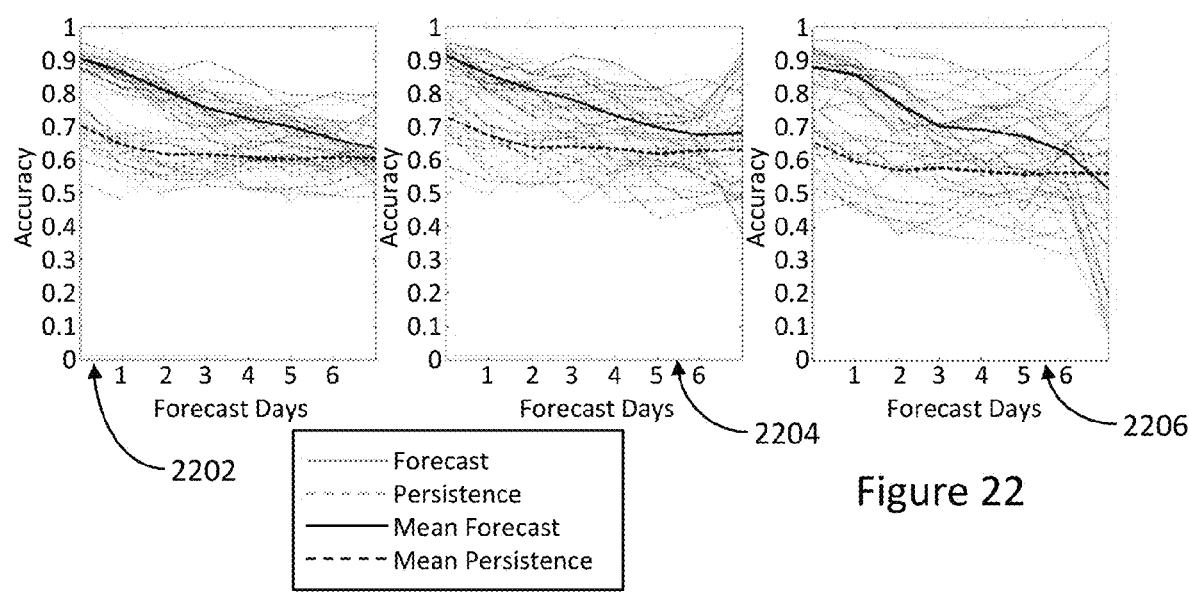
FIG. 22 illustrates quality metrics for forecasts relative to persistence.

To provide context to the performance of the model forecast predictions, the ACNFS opening rate forecasts were compared against persistence. Persistence assumes no skill in forecasting. The last known condition, in this case the reference hindcast opening rates for the day prior to the nowcast day, is held constant for all forecast days. The same statistics used to analyze the model forecasts were calculated for the persistence forecasts. As expected, the RMSE, accuracy, sensitivity, and specificity statistics show that the ACNFS forecasts performed better than persistence. This improvement extended out to 6 forecast days. By the 7 day forecast, persistence had almost caught up to the model forecasts. FIG. 21 and FIG. 22 shows the improvements in model forecasting relative to persistence, which is represented as dotted lines. FIG. 21 illustrates the RMSE for individual forecasts relative to persistence, and FIG. 22 illustrates quality metrics for the individual forecasts for accuracy 2202, sensitivity 2204, and specificity 2206 relative to persistence. Individual forecasts and their corresponding persistence are shown in matching colors.

Navy submarines have conducted under-ice operations in the Arctic regions in support of inter-fleet transit, training cooperative allied engagements and operations for more than 50 years. Since 1958, the U.S. Submarine Force has completed more than 120 Arctic exercises.

Arctic Submarine Laboratory Ice Exercise (ICEX-2014) began on Mar. 17, 2014 and was built into an ice floe north of Prudhoe Bay, Alaska and was scheduled to continue through Mar. 30, 2014. However, large shifts in the prevailing wind direction between March $18^{th}$ and March $20^{th}$ created instabilities in the wind-driven ice floes on the Arctic Ocean which led to multiple fractures in the ice ear the camp. These cracks prevented the use of several airfields used for transporting personnel and equipment to the ice camp. The rapidly changing conditions of the ice, along with extremely low temperatures and poor visibility hampered helicopter operations and made sustaining the runway potentially risky. Because of this the Commander, Submarine Forces (COMSUBFOR) announced an early end to the ICEX-2014 on March 23.

Examining the ACNFS/NAVGEM forecasts leading up to the events show that large-scale fracturing was predicted 24 to 48 hours prior to events and the strong winds and wind reversals predicted up to 6 days in advance. Ice fractures were already prevalent in the general area in the weeks leading up to the exercise, but strong shifts in winds brought more. Strong easterly winds picked up across the Beaufort March $15^{th}$ and $16^{th}$ and a strong reversal of winds occurred March 20 to 21st, forcing the shutdown of operations.

Figure 23:
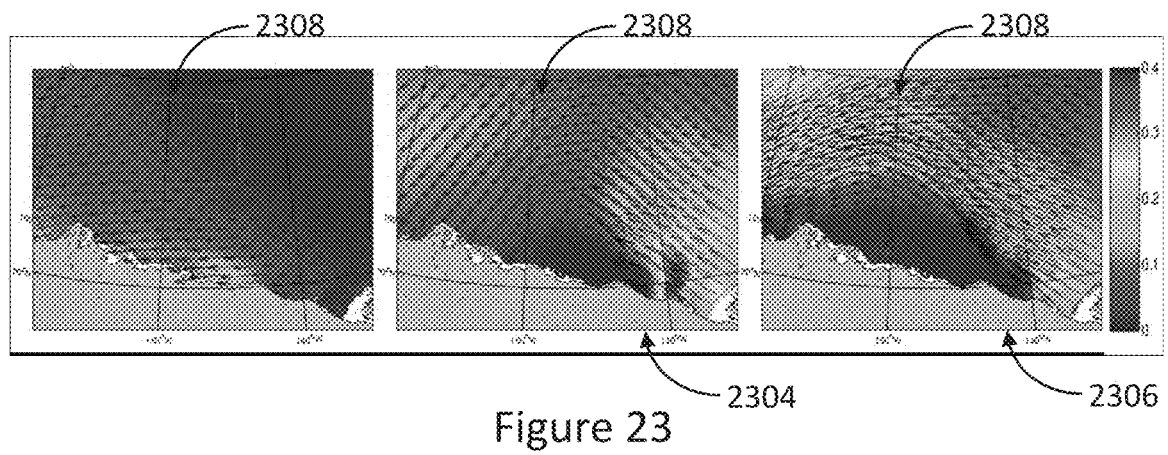
FIG. 23 shows the ACNFS air stress.

FIG. 23 shows the increase in strong easterly winds on March $15^{th}$ 2304 and $16^{th}$ 2306 reflected in the ACNFS air stress. The general area of the ice camp 2308 is outlined in red.

Figure 24:
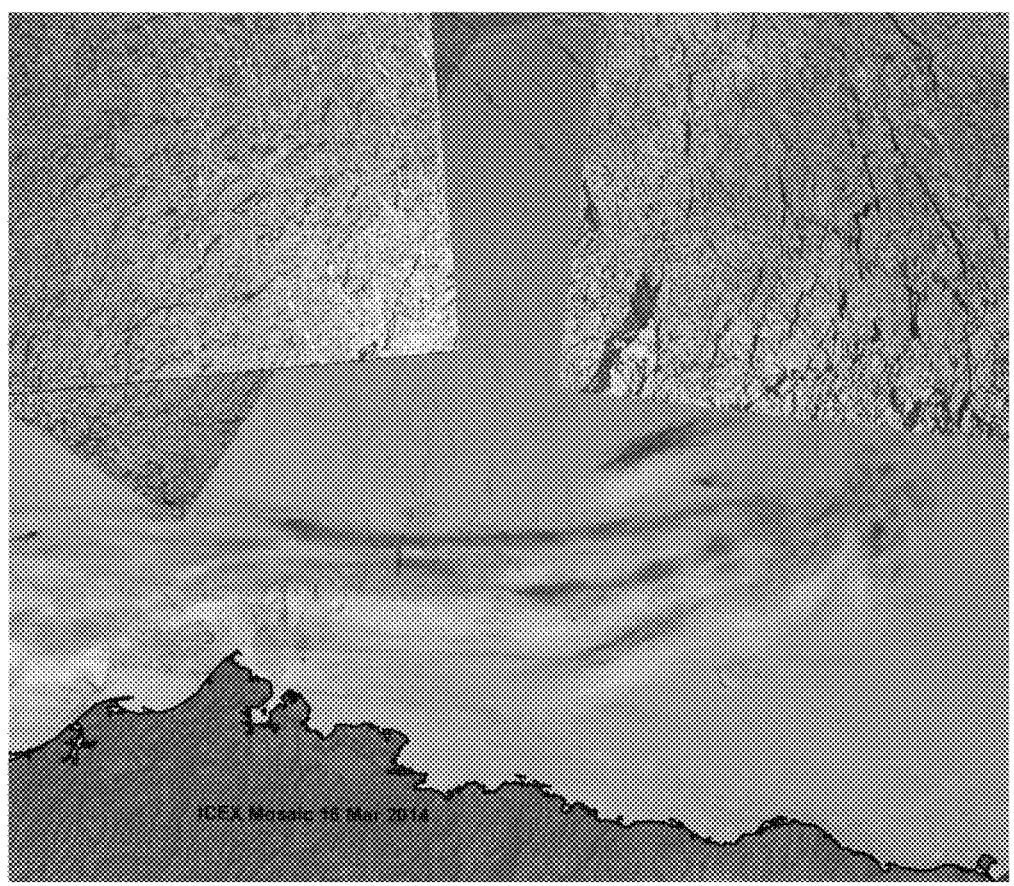
FIG. 24 depicts a MODIS and RADARSAT-2 mosaic image.
Figure 25:
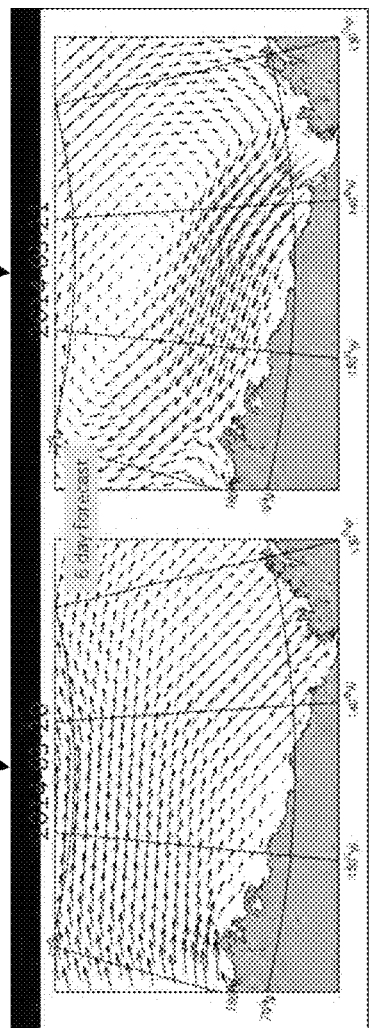
FIG. 25 shows example ACNFS forecasts.

FIG. 24 depicts a MODIS and RADARSAT-2 mosaic image for Mar. 16, 2014. Fracturing is seen throughout the region with fractures running from northwest to southeast and from north to south. FIG. 25 shows an example ACNFS nowcast 2502, ACNFS 24 hour forecast 2504, ACNFS 48 hour forecast 2506, and ACNFS 72 hour forecast 2508. The strong fracturing was predicted as early as in the ACNFS 48 hour forecast 2506, as seen in FIG. 25.

Figure 26:
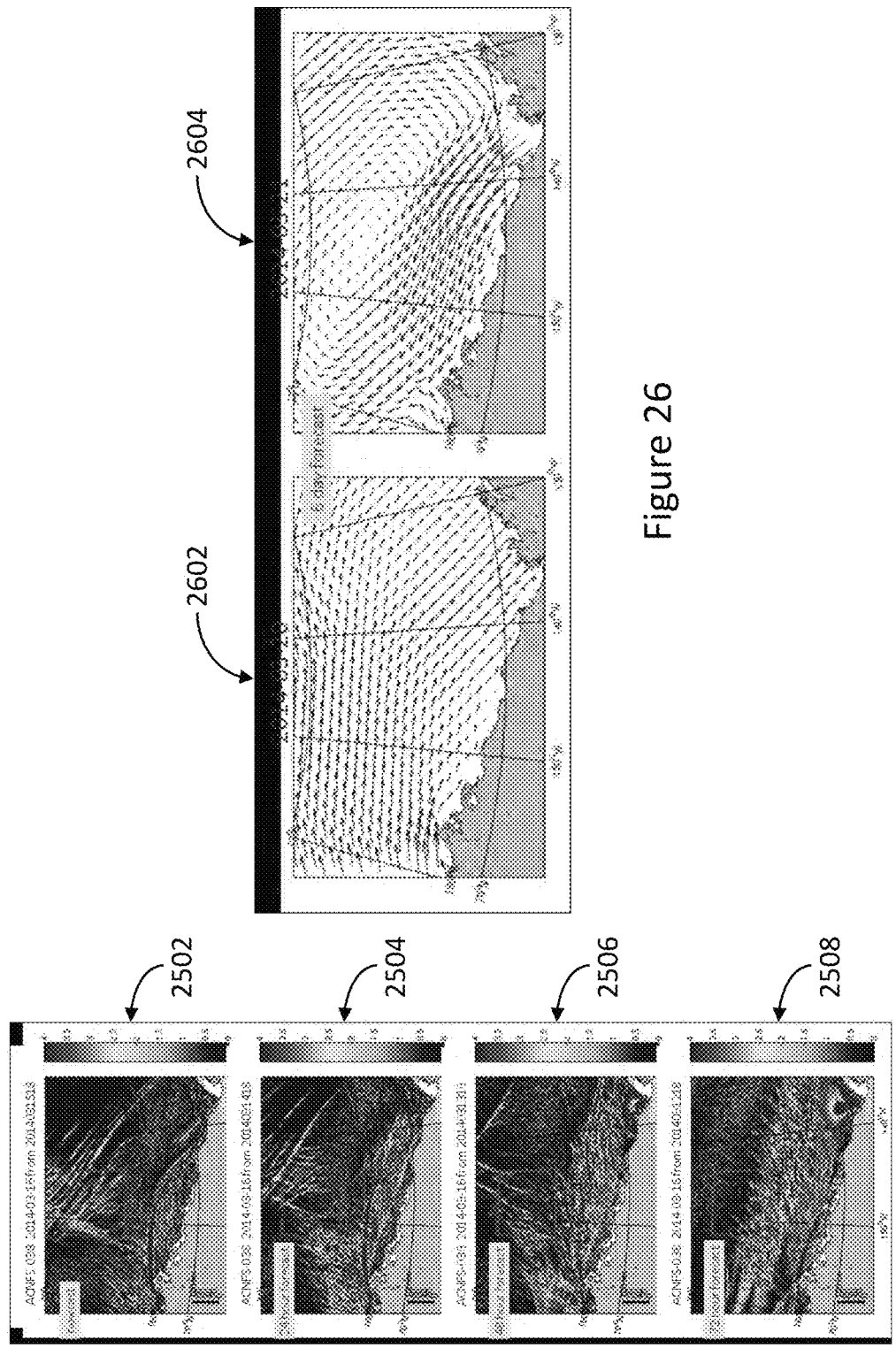
FIG. 26 shows a 6 day forecast of ice drift.

The strong reversal of forcing and ice velocity occurred March $20^{th}$, 2602 to March $21^{st}$, 2604 and was predicted by ACNFS/NAVGEM as early as the 6-day forecast as shown in FIG. 26.

Figure 27:
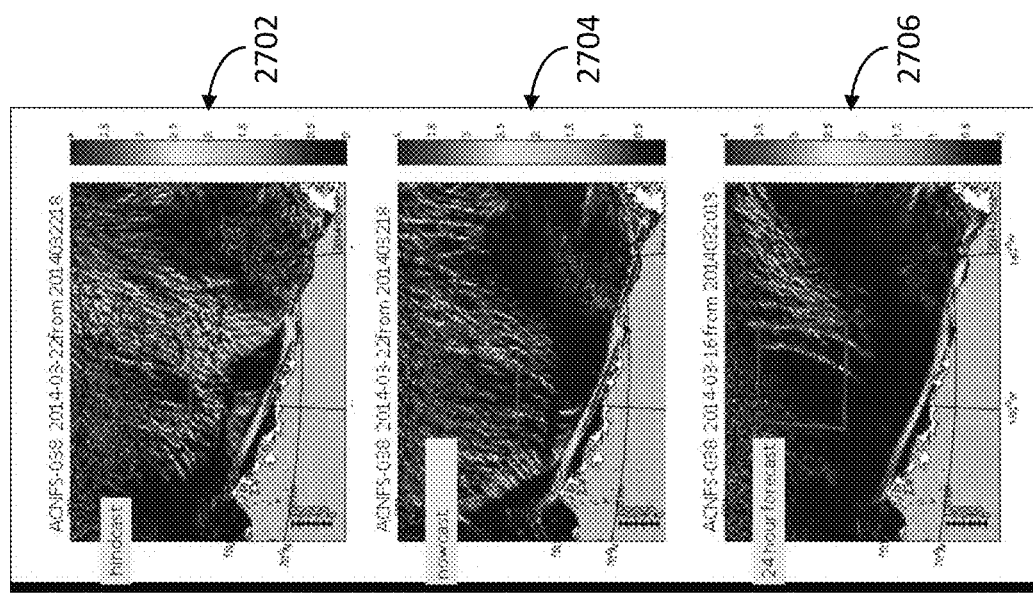
FIG. 27 shows example ACNFS forecasts.

Some central Beaufort openings occurred on the $20^{th}$ and $21^{st}$, but strong north south fracturing occurred on the $22^{nd}$. FIG. 27 shows an example ACNFS hindcast 2702, ACNFS nowcast 2704, and ACNFS 24 hour forecast 2706. The openings on March $22^{nd}$ are shown in the 24 hour forecast

Figure 28:
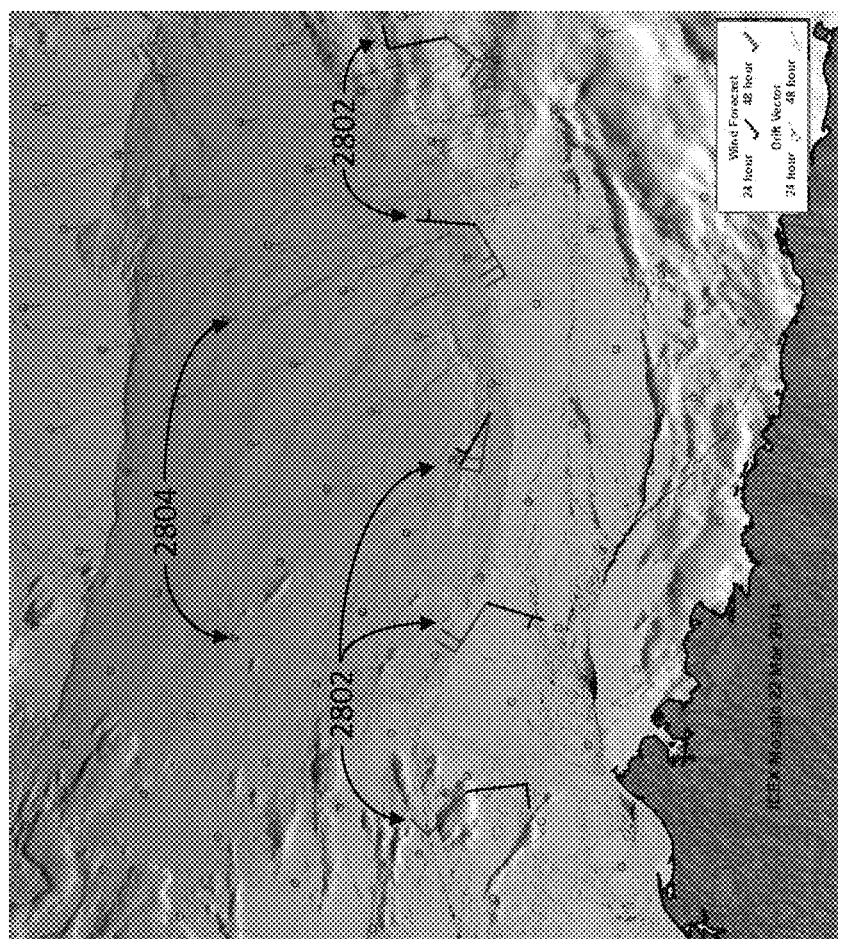
FIG. 28 shows a MODIS mosaic.

2706. FIG. 28 shows a MODIS mosaic showing the fractures on the 22$^{nd}$ as well as wind 2802 and ice drift 2804 vectors.

ACNFS does an excellent job capturing polynyas. In the opening rate plots, polynyas are well depicted and are often differentiated from fracture areas with sharper delineation from the surrounding ice, but they are most reliably seen with the ice concentration. Polynyas are persistent large non-linear shaped regions of open water with length scales on the order of 100 km and generally much larger area than ice fractures and leads. With their persistence and size, they are typically captured in satellite ice concentration imagery and consequently the model ice concentration output. There are two types of polynyas: coastal and open ocean. Coastal polynyas are found adjacent to coastlines and are driven by persistent offshore winds. Open ocean polynyas are enclosed in the pack ice and are driven by warm water upwelling.

Figure 29:
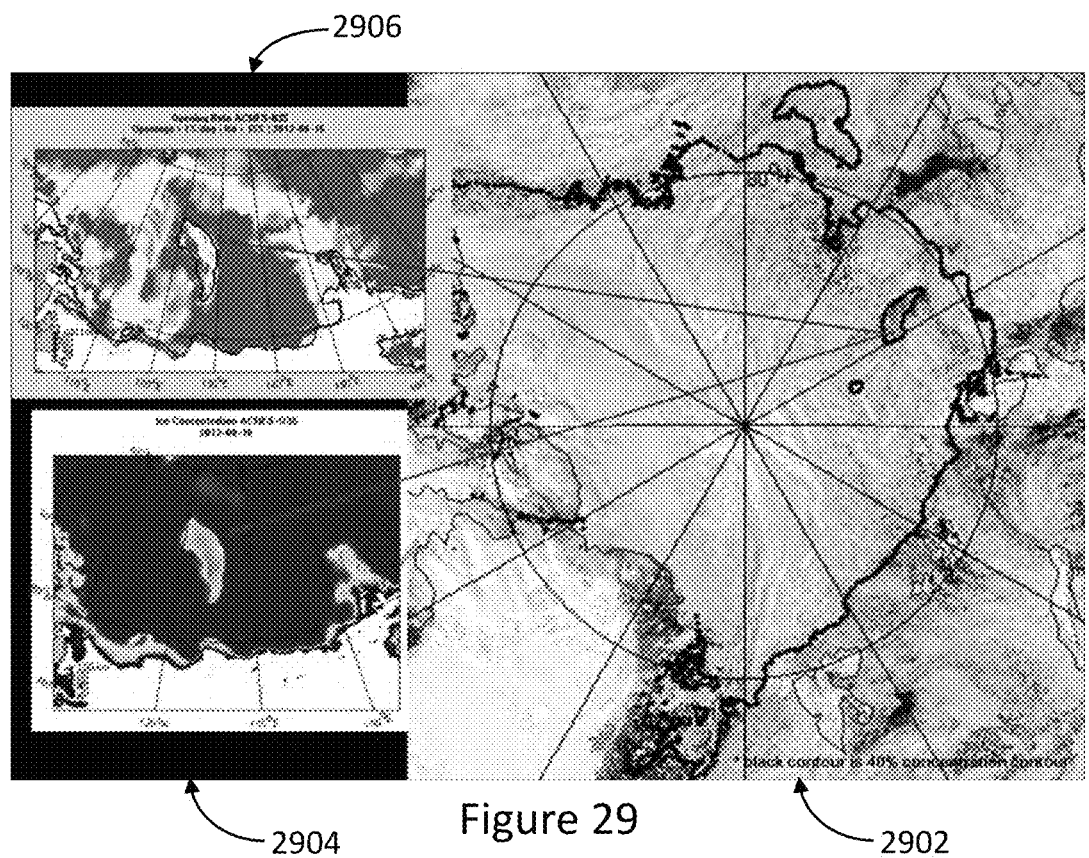
FIG. 29 shows an example of an open water polynya.

FIG. 29 shows an example of an open water polynya seen in MODIS imagery 2902 and ACNFS opening rate 2904, and ACNFS ice concentration 2906. This particular polynya persisted for over a month until consumed by the ice edge. MODIS imagery 2902 shows ACNFS 40% concentration contour overlaid in black. ACNFS opening rate 2906 shows 40% concentration contour.

Figure 30:
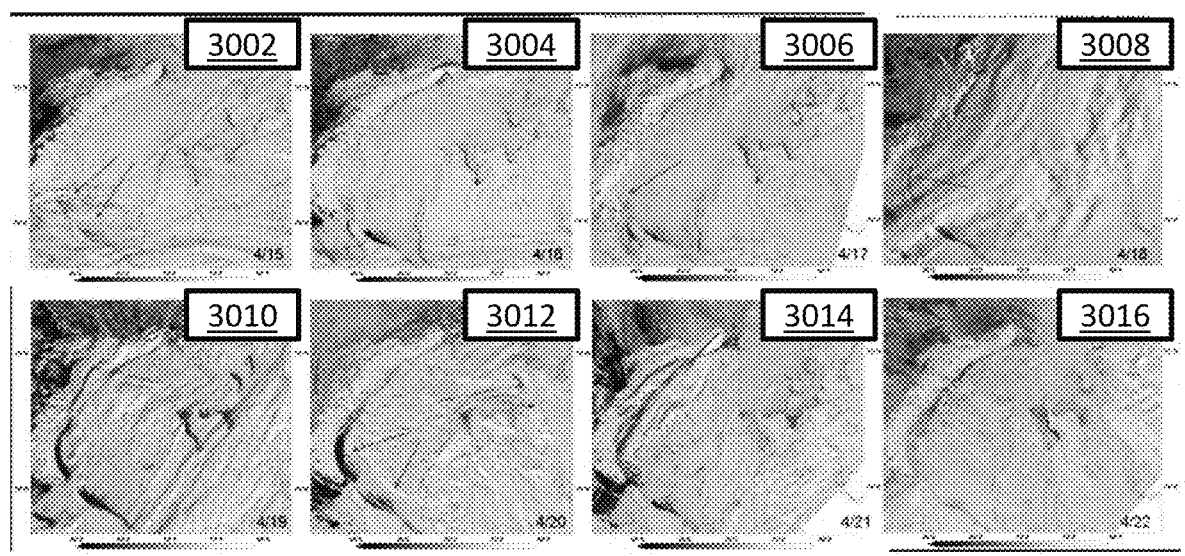
FIG. 30 illustrates an example of coastal polynyas.
Figure 31:
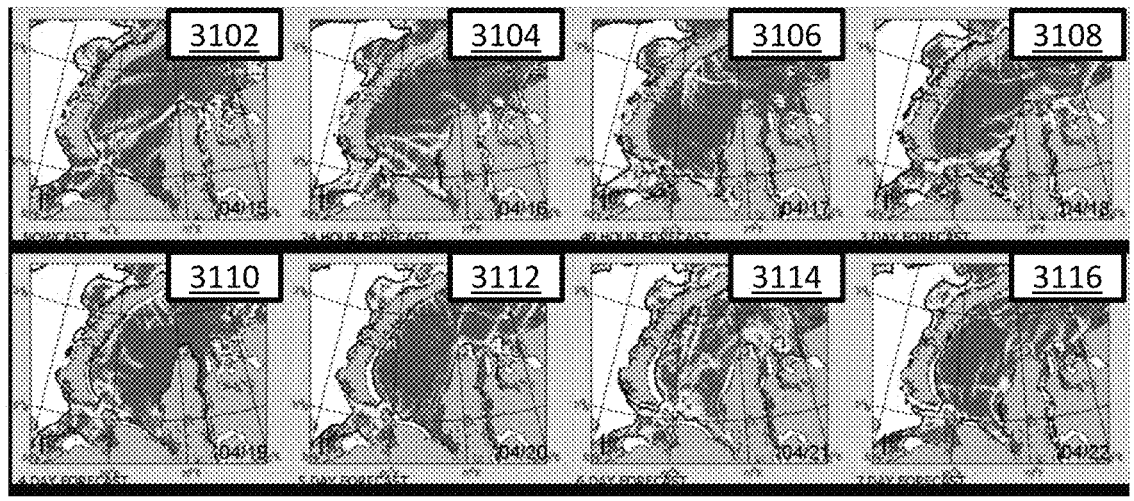
FIG. 31 shows the ACNFS forecasting capability.

FIG. 30 and FIG. 31 illustrate an example of coastal polynyas and the ACNFS forecasting capability. FIG. 30 shows 8 consecutive days 3002-3016 of VIIRS near-constant contrast (NCC) imagery over the Kara Sea starting Apr. 15, 2014, 3002. Note the polynyas in the south Kara Sea on either side of the Kara Strait. The polynyas fluctuate in size as the ice moves away and towards the shores.

FIG. 31 shows the nowcast and 7-day opening rate forecasts 3102-3116 from Apr. 15, 2014, 3102. The 70% ice concentration for each model forecast is contoured and overlaid in black. Starting from the nowcast day Apr. 15, 3102, two polynya can be seen, one on each side of the Kara Strait. The polynya on the east side persists throughout the time period increasing and decreasing slightly in size. The polynya on the west side shrinks and then returns and extends northward along the east Novaya Zemlya coastline. These same features are seen in the ACNFS model output.

Figure 32:
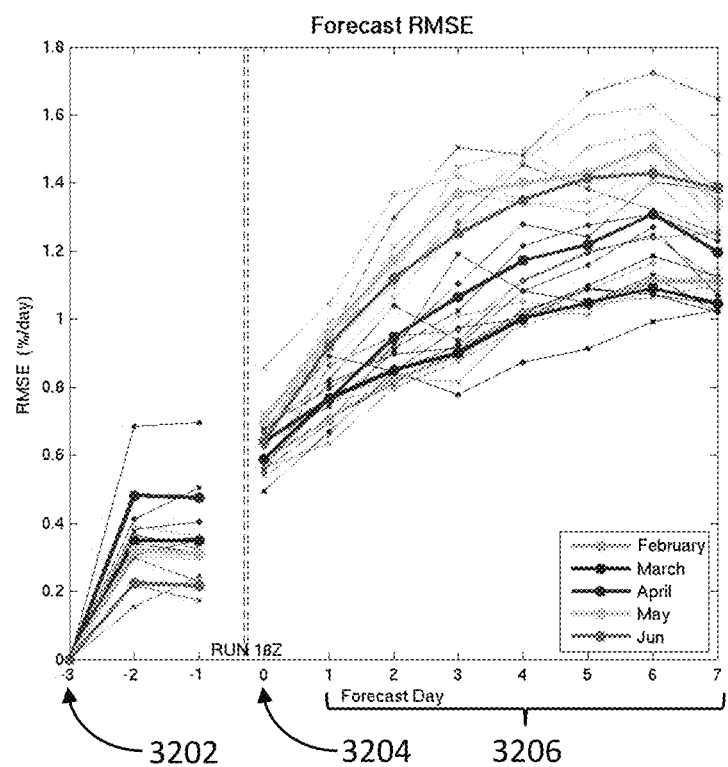
FIG. 32 shows the RMSE computed for sample monthly forecasts.
Figure 33:
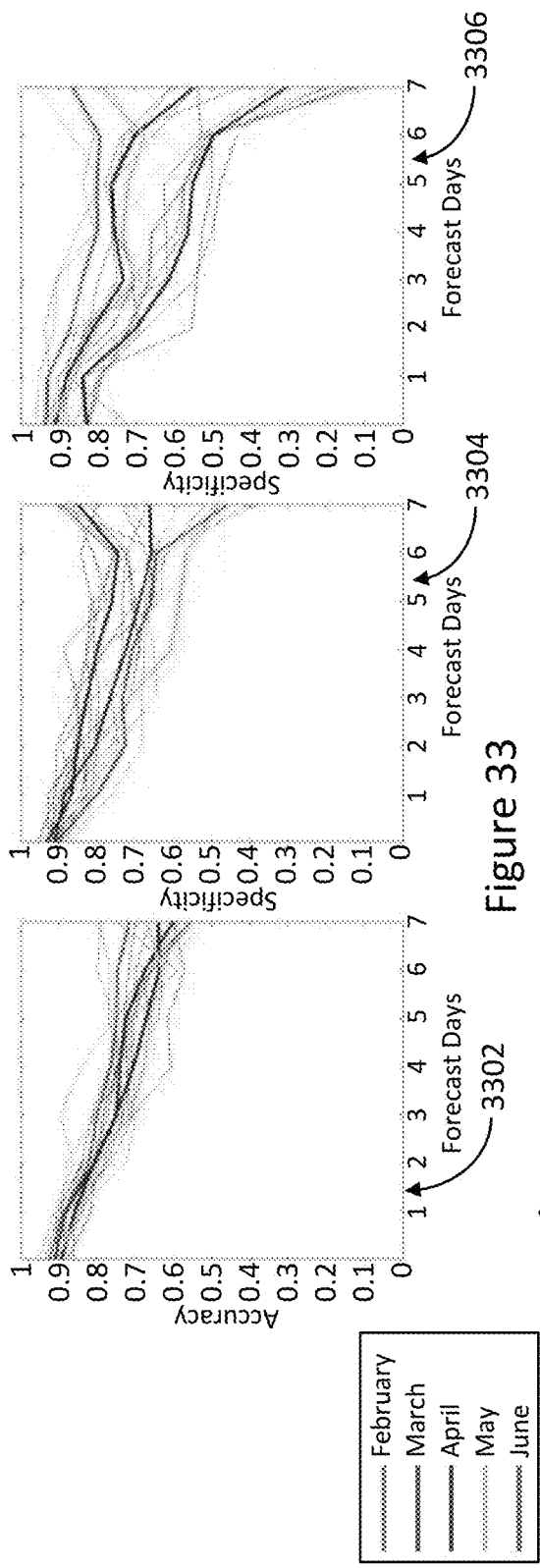
FIG. 33 shows example monthly quality metrics.
Figure 34:
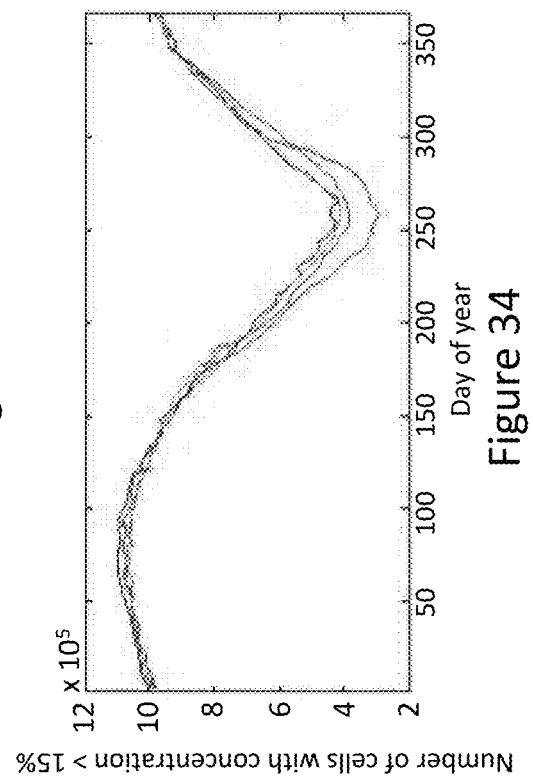
FIG. 34 shows annual trends in open rate forecasting.

Seasonal variability in the performance of opening rate forecasts is seen in the magnitudes of the Root Mean Square Error (RMSE) and classification errors sensitivity and specificity. FIGS. 32, 33, and 34 show the seasonal/monthly variability. FIG. 32 shows the RMSE computed for the same sample forecasts 1801 as shown in FIG. 18, color coded by month. The hindcasts 3202 are included in the computations and are shown as negative forecast days. The reference hindcast is shown as −3 days 3202 with an error=0. The daily nowcast analyses are shown at day 0 3204 with the forecast days 3206 to the right. The monthly mean RMSE forecast values are overlaid as bolder lines. FIG. 33 shows the quality metrics for accuracy 3302, sensitivity 3304, and specificity 3306. Forecasting is more reliable in the winter than in the spring, but at the same time is slightly less likely to predict non-openings, but slightly more likely to predict openings. The accuracy remains consistent between seasons. Forecast specificities were lower in February/March as the number of ice cells reaches a maximum in FIG. 34.

The overall accuracy shows little difference between the seasons, but the sensitivity and specificity show changes especially after 72 hours. In winter, when there are fewer ice openings, ACNFS does a better job predicting the opening regions, whereas in the spring as more fracturing occurs, the model does a better job predicting the non-openings.

TABLE 1 listed the category totals from all of the FLAP message comparisons. TABLE 3 lists the same category totals from all the FLAP message comparisons against ACNFS by season/month. As with the model forecast to model hindcast comparisons, winter had overall better results than spring in predicting the openings.

TABLE 3

FLAP area prediction comparison categories totals broken out by season.

| | Fracture Regions | | | Percent of Fracture Regions | | | | | | |
|---|---|---|---|---|---|---|---|---|---|---|
| | ✓ | ? | X | ✓ | off-set | partial | subset | weak | ? | ✓ + ? | X |
| Winter: Jan-Mar | | | | | | | | | | | |
| ACNFS opening rate | 2 | 7 | 0 | 22% | 11% | 11% | 56% | 0% | 78% | 100% | 0% |
| GOFS opening rate | 3 | 6 | 0 | 33% | 22% | 11% | 33% | 0% | 67% | 100% | 0% |
| ACNFS accumulated openings | 4 | 5 | 0 | 44% | 11% | 0% | 44% | 0% | 56% | 100% | 0% |
| Spring: Apr-Jun | | | | | | | | | | | |
| ACNFS opening rate | 15 | 23 | 9 | 32% | 6% | 17% | 15% | 11% | 49% | 81% | 19% |
| GOFS opening rate | 13 | 24 | 12 | 27% | 2% | 14% | 18% | 14% | 49% | 76% | 24% |
| ACNFS accumulated openings | 16 | 31 | 1 | 33% | 2% | 8% | 50% | 4% | 65% | 98% | 2% |
| Summer: Jul-Sep | | | | | | | | | | | |
| ACNFS opening rate | 6 | 17 | 3 | 23% | 8% | 42% | 15% | 0% | 65% | 88% | 12% |
| GOFS opening rate | 4 | 14 | 11 | 14% | 0% | 34% | 14% | 0% | 48% | 62% | 38% |
| ACNFS accumulated openings | 9 | 15 | 3 | 33% | 0% | 26% | 30% | 0% | 56% | 89% | 11% |
| Fall: Oct-Dec | | | | | | | | | | | |
| ACNFS opening rate | 26 | 42 | 5 | 35% | 3% | 18% | 24% | 21% | 57% | 92% | 8% |
| GOFS opening rate | 22 | 41 | 10 | 30% | 5% | 21% | 18% | 12% | 56% | 86% | 14% |
| ACNFS accumulated openings | 38 | 44 | 2 | 45% | 4% | 7% | 37% | 5% | 52% | 97% | 2% |

This validation assessment was performed using ACNFS with some limited comparisons with GOFS3.1. Results of the validation testing of the ACNFS' best quality prediction against actual FLAP messages as ground truth and model forecasts against reference hindcasts were presented. Additional comparisons were shown from ICEX-2014 and isolated available imagery. TABLE 4 presents the summary statistics for the NIC FLAP area comparisons. The FLAP areas were strongly matched in the ACNFS accumulated openings at 40%, while only 4% were missed completely. TABLE 5 presents the summary statistics for the FLAP forecast capability as compared with persistence for the first 72 hours of forecasts. The ACNFS forecast showed a 47% improvement over persistence for the nowcast in terms of RMSE error with an 18% improvement out to 3 days. Accuracy, sensitivity, and specificity forecast improvements were approximately 30% for the nowcast and 20% for the 3 day forecast.

TABLE 4

FLAP area skill totals

| | Percent of FLAP Message Fracture Regions | | | |
|---|---|---|---|---|
| | Strong match | Partial match | Strong and partial match | No match |
| ACNFS accumulated openings | 40% | 57% | 97% | 4% |

TABLE 5

FLAP area forecast skill metrics for first 72 hours.

| | Nowcast | 24 hour | 48 hour | 72 hour |
|---|---|---|---|---|
| RMSE ACNFS | 0.63 | 0.82 | 0.98 | 1.09 |
| RMSE Persistence | 1.19 | 1.28 | 1.3 | 1.33 |
| Accuracy ACNFS | 0.9 | 0.86 | 0.81 | 0.75 |
| Accuracy Persistence | 0.7 | 0.64 | 0.62 | 0.62 |
| Sensitivity ACNFS | 0.91 | 0.85 | 0.81 | 0.78 |
| Sensitivity Persistence | 0.73 | 0.67 | 0.64 | 0.64 |
| Specificity ACNFS | 0.88 | 0.86 | 0.77 | 0.7 |
| Specificity Persistence | 0.65 | 0.6 | 0.57 | 0.58 |

Overall, ACNFS/GOFS provided a reasonable prediction of the openings not available elsewhere in either nowcast or forecast mode and performed better than simple persistence of the best model hindcast. This validation has shown that ACNFS and GOFS 3.1 nowcast/forecasts provide an indication of fracture regions.

Figure 35:
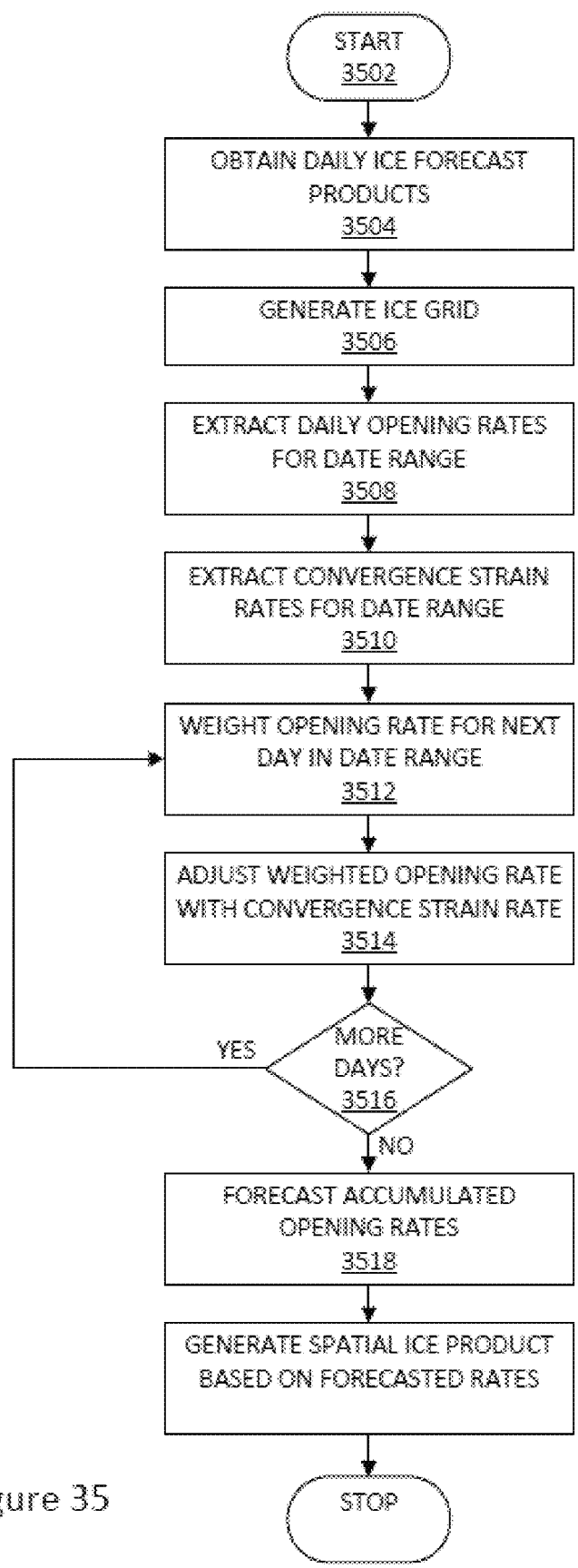
FIG. 35 shows an example workflow for leads and polynyas forecasting.

FIG. 35 shows an example workflow for leads and polynyas forecasting. As is the case with the other processes described herein, various embodiments may not include all of the steps described below, may include additional steps, and may sequence the steps differently. Accordingly, the specific arrangement of steps shown in FIG. 35 should not be construed as limiting the scope of leads and polynyas forecasting.

In block 3502, the method starts and proceeds to block 3504, where forecasted ice model data is obtained. The model ice forecasts may be originally derived from satellites, and other observed atmospheric/ice conditions. In block 3506, a uniform ice grid is generated based on the forecasted ice data. The ice grid is a spatial grid of the area of interest that can be used to model properties of the sea ice. The number of grid cells determines the spatial resolution of the domain.

In block 3508, daily opening rates for each day in a date range are extracted from the ice grid. In block 3510, convergence strain rates for each day in the date range are extracted from the ice grid. In blocks 3512-3516, each day in the date range is processed as discussed above with respect to Equation (3) and FIG. 6. In block 3512, the daily opening rates for a day in the date range is weighted. In block 3514, the weighted daily opening rates are adjusted with the convergence strain rates for the day. In block 3516, if there are more days in the date range to process, adjusted opening rates are determined for the next day in the date range as described above in blocks 3512 and 3514 and then maximally joined to the previously determined adjusted daily accumulated opening rates.

If there are no more days in the date range, a forecasted accumulated opening rate for a target date is determined based on the joined opening rate in block 3518. The forecasted opening rate can then be used to generate a spatial ice product, which can be rendered as spatial data on a display. Scale limits and a minimum opening rate for the opening rates can be set as discussed above to better show fractures in the rendered spatial ice product. Further, the date range can be adjusted to increase or decrease the amount of historical ice data used.

Figure 36:
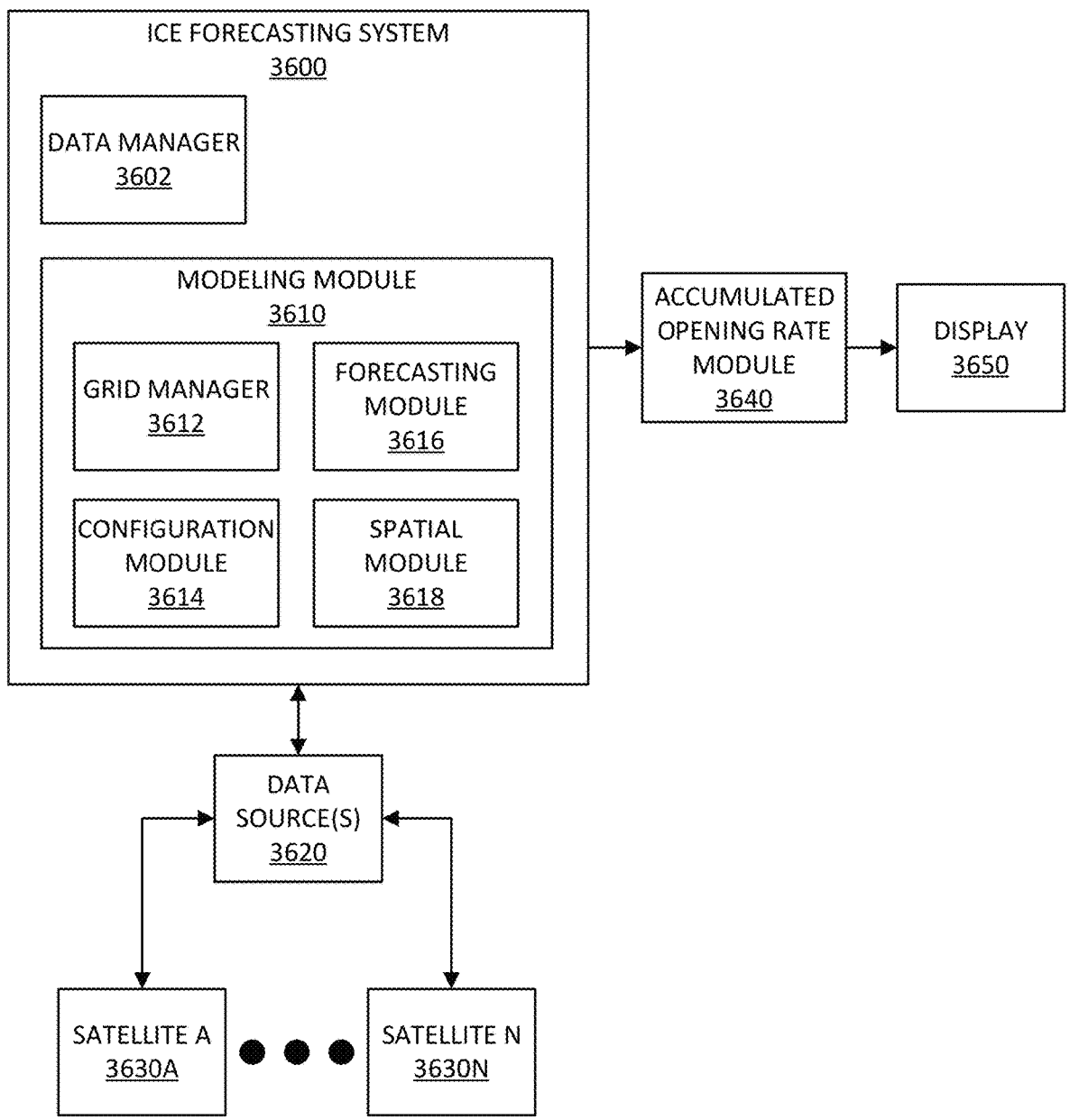
FIG. 36 shows an example system for leads and polynyas forecasting.

FIG. 36 shows an example system 3600 for sea ice forecasting. The ice forecasting system 3600 interacts with data source(s) 3620 and accumulated opening rate module 3640. Ice forecasting system 3600 includes a data manager 3602 and a modeling module 3610.

The data manager 3602 of ice forecasting system 3600 is configured to obtain observed ice data from data source(s) 3620. The observed ice data can be stored in various data formats and originate from various sources such as satellites 3630A-3630N, ice modeling products, data sensors, etc.

The modeling module 3610 of ice forecasting system 3600 is configured to generate ice models as described above with respect to FIG. 36. Specifically, grid manager 3612 can be configured to generate an ice grid for modeling parameters forecasted from the observed ice data. In generating the ice grid, grid manager 3612 can determine the quantity of cells in the ice grid based on attributes of the observed ice data (e.g., data resolution, maximum extent, etc.).

Configuration module 3614 is configured to allow a user to specify parameters for generating and then displaying an ice model on a display 3650. For example, the configuration module 3614 can allow a user to specify the date range of observed ice data that should be used to generate ice model forecasts. Forecasting module 3616 is configured to generate ice model forecasts using the ice grid from grid manager 3612 and the observed ice data from data manager 3602.

Spatial module 3618 is configured to render ice model products on display 3650. Spatial module 3618 may render an ice module according to parameters specified by the user using the configuration module 3614. Spatial module 3618 may also allow the user to interact with the ice model products (e.g., zoom, pan, modify annotations, etc.) and/or overlay other spatial data such as points of interest, imagery, etc. over the ice model. Accumulated opening rates products are post-processed in accumulated opening rate module 3640 and then used to render ice model products on display 3650.

Figure 37:
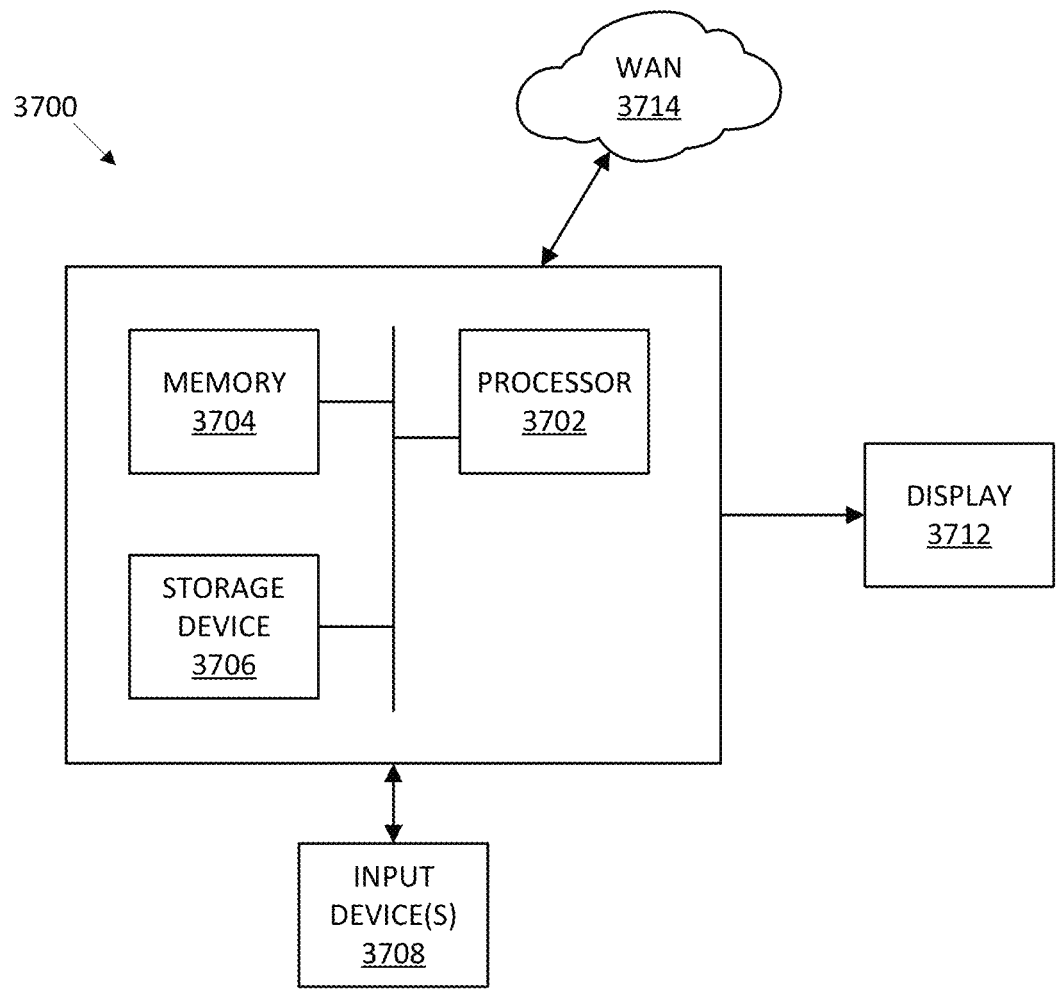
FIG. 37 is a diagram of an example computer system for leads and polynyas forecasting.

Components of the invention may be implemented on a variety of computer systems regardless of the platform being used. For example, as shown in FIG. 37, a computer system 3700 can include a processor 3702, associated memory 3704, a storage device 3706, and numerous other elements and functionalities typical of today's computers (not shown). The computer 3700 may also include input means 3708, such as a keyboard and a mouse, and output means 3712, such as a monitor. The computer system 3700 may be connected to a local area network (LAN) or a wide area network (e.g., the Internet) 3714 via a network interface connection (not shown). Those skilled in the art will appreciate that these input and output means may take other forms.

Further, those skilled in the art will appreciate that one or more elements of the aforementioned computer system 3700 may be located at a remote location and connected to the other elements over a network. Further, the invention may be implemented on a distributed system having a plurality of nodes, where each portion of the invention (e.g., data manager, modeling module, accumulated opening rate module, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for leads and polynyas forecasting, the method comprising:
   obtaining observed ice forecast data for a geographic area of interest with sea ice, wherein the observed ice data is collected by a plurality of satellites;
   generating, using a computer processor, an ice grid based on the observed ice data, wherein the ice grid comprises a plurality of grid cells that map the polar regions;
   determining a plurality of daily opening rates based on the ice grid, wherein each daily opening rate of the plurality of daily openings indicates an opening speed of a corresponding ice event for one of a plurality of days;
   determining a plurality of daily convergence strain rates based on the ice grid, wherein each daily convergence strain rate of the plurality of daily convergence strain rates indicates a convergence of the corresponding ice event for one of the plurality of days;
   weighting, using the computer processor, respective daily opening rates in the plurality of daily opening rates for each day in the plurality of days, wherein respective daily opening rates in the plurality of daily opening rates are weighted such that respective daily opening rates having measurement times that are closer to a target date are assigned higher weights than respective daily opening rates having measurement times that are farther from the target date, and wherein each daily opening rate in the plurality of daily opening rates is assigned a different weight;
   adjusting the respective weighted daily opening rates based on respective daily convergence strain rates of the plurality of daily convergence strain rates;
   determining a forecasted opening rate for each of the plurality of grid cells on the target date based on the weighted, adjusted daily opening rates for the plurality of days; and
   rendering, on a display, predicted openings of the polar region based on the forecasted opening rate for each of the plurality of grid cells.

2. The method of claim 1, further comprising smoothing and contouring the opening rate for each of the plurality of grid cells.

3. The method of claim 1, wherein the plurality of days is from three to seven sequential days.

4. The method of claim 1, wherein a daily opening in the plurality of daily opening rates that corresponds to a day prior to the target date is assigned a first weight, wherein a daily opening in the plurality of daily opening rates that corresponds to two days prior to the target date is assigned a second weight, wherein a daily opening in the plurality of daily opening rates that corresponds to three days prior to the target date is assigned a third weight, wherein the third weight is lower than the first weight and the second weight, and wherein the second weight is lower than the first weight.

5. The method of claim 1, wherein adjusting the respective weighted daily opening rates based on respective daily convergence strain rates comprises:
   subtracting the respective convergence strain rates from respective weighted daily opening rates.

6. The method of claim 1, further comprising determining an accumulating opening from a day prior to the target date based on:

$$\varepsilon_{A_i} = \max\{\omega_i \varepsilon_{A_{i-1}} - \varepsilon_{D_i}, \varepsilon_{O_i}\},$$

wherein i is the day prior to the target date, $\varepsilon_A$ is an accumulated opening from the day prior to the target date, $\varepsilon_O$ is a daily opening rate of the day prior to the target date, $\varepsilon_D$ is a convergence strain rate of the day prior to the target date, and $\omega_i$ is a damping weight applied to the daily opening rate of the day prior to the target date.

7. The method of claim 6, further comprising determining openings for the target date based on:

$$O_d = \max\{\omega_d \varepsilon_{A_{d-1}} - \varepsilon_{D_d}, \varepsilon_{O_d}\},$$

wherein d is the target date, and wherein $O_d$ represents an opening for the target date.

8. The method of claim 7, further comprising determining a three day accumulation for openings for the target date based on:

$$O_d = \max\{\max\{\max\{\omega_{d-3}\varepsilon_{A_{d-3}} - \varepsilon_{D_{d-2}}, \omega_{d-2}\varepsilon_{A_{d-2}}\} - \varepsilon_{D_{d-1}}, \omega_{d-1}\varepsilon_{A_{d-1}}\} - \varepsilon_{D_d}, \varepsilon_{A_d}\}.$$

9. The method of claim 8, further comprising selecting weights of $\omega_i = \{0.8, 0.6, 0.4, 0.2, 0\}$ for i=d to d−4.

10. A non-transitory computer-readable medium comprising executable instructions for causing an ice forecasting system to:
   obtain observed ice forecast data for a geographic area of interest with sea ice, wherein the observed ice data is collected by a plurality of satellites;
   generate an ice grid based on the observed ice data, wherein the ice grid comprises a plurality of grid cells that map the polar regions;
   determine a plurality of daily opening rates based on the ice grid, wherein each daily opening rate of the plurality of daily openings indicates an opening speed of a corresponding ice event for one of a plurality of days;
   determine a plurality of daily convergence strain rates based on the ice grid, wherein each daily convergence strain rate of the plurality of daily convergence strain rates indicates a convergence of the corresponding ice event for one of the plurality of days;

weight respective daily opening rates in the plurality of daily opening rates for each day in the plurality of days, wherein respective daily opening rates in the plurality of daily opening rates are weighted such that respective daily opening rates having measurement times that are closer to a target date are assigned higher weights than respective daily opening rates having measurement times that are farther from the target date, and wherein each daily opening rate in the plurality of daily opening rates is assigned a different weight;

adjusting the respective weighted daily opening rates based on respective daily convergence strain rates of the plurality of daily convergence strain rates;

determine a forecasted opening rate for each of the plurality of grid cells on the target date based on the weighted, adjusted daily opening rates for the plurality of days; and render, on a display, predicted openings of the polar region based on the forecasted opening rate for each of the plurality of grid cells.

11. The non-transitory computer-readable medium of claim 10, further comprising smoothing and contouring the opening rate for each of the plurality of grid cells.

12. The non-transitory computer-readable medium of claim 10, wherein the plurality of days is from three to seven sequential days.

13. The non-transitory computer-readable medium of claim 10, wherein the instructions cause the ice forecasting system to adjust the respective weighted daily opening rates based on respective daily convergence strain rates by subtracting the respective convergence strain rates from respective weighted daily opening rates.

14. The non-transitory computer-readable medium of claim 10, wherein the instructions cause the ice forecasting system to determine an accumulating opening from a day prior to the target date based on:

$$\varepsilon_{A_i} = \max\{\omega_i \varepsilon_{A_{i-1}} - \varepsilon_{D_i}, \varepsilon_{O_i}\},$$

wherein i is the day prior to the target date, EA is an accumulated opening from the day prior to the target date, $\varepsilon_O$ is a daily opening rate of the day prior to the target date, $\varepsilon_D$ is a convergence strain rate of the day prior to the target date, and $\omega_i$ is a damping weight applied to the daily opening rate of the day prior to the target date.

15. The non-transitory computer-readable medium of claim 14, wherein the instructions cause the ice forecasting system to determine openings for the target date based on:

$$O_d = \max\{\omega_d \varepsilon_{A_{d-1}} - \varepsilon_{D_d}, \varepsilon_{O_d}\},$$

wherein d is the target date, and wherein $O_d$ represents an opening for the target date.

16. A system for leads and polynyas forecasting, the system comprising:
a processor; and
a memory storing instructions, execution of which causes the processor to perform operations comprising:
obtaining observed ice forecast data for a geographic area of interest with sea ice, wherein the observed ice data is collected by a plurality of satellites,
generating an ice grid based on the observed ice data, wherein the ice grid comprises a plurality of grid cells that map the polar regions,
determining a plurality of daily opening rates based on the ice grid, wherein each daily opening rate of the plurality of daily openings indicates an opening speed of a corresponding ice event for one of a plurality of days,
determining a plurality of daily convergence strain rates based on the ice grid, wherein each daily convergence strain rate of the plurality of daily convergence strain rates indicates a convergence of the corresponding ice event for one of the plurality of days,
weighting respective daily opening rates in the plurality of daily opening rates for each day in the plurality of days, wherein respective daily opening rates in the plurality of daily opening rates are weighted such that respective daily opening rates having measurement times that are closer to a target date are assigned higher weights than respective daily opening rates having measurement times that are farther from the target date, and wherein each daily opening rate in the plurality of daily opening rates is assigned a different weight,
adjusting the respective weighted daily opening rates based on respective daily convergence strain rates of the plurality of daily convergence strain rates,
determining a forecasted opening rate for each of the plurality of grid cells on the target date based on the weighted, adjusted daily opening rates for the plurality of days, and
rendering, on a display, predicted openings of the polar region based on the forecasted opening rate for each of the plurality of grid cells.

17. The system of claim 16, wherein adjusting the respective weighted daily opening rates based on respective daily convergence strain rates of the plurality of daily convergence strain rates comprises subtracting respective convergence strain rates for each day in the plurality of days from corresponding respective weighted daily opening rates.

18. The system of claim 16, wherein the operations further comprise adjusting the respective weighted daily opening rates based on respective daily convergence strain rates comprises:
subtracting the respective convergence strain rates from respective weighted daily opening rates.

19. The system of claim 16, wherein the operations further comprise determining an accumulating opening from a day prior to the target date based on:

$$\varepsilon_{A_i} = \max\{\omega_i \varepsilon_{A_{i-1}} - \varepsilon_{D_i}, \varepsilon_{O_i}\},$$

wherein i is the day prior to the target date, $\varepsilon_A$ is an accumulated opening from the day prior to the target date, $\varepsilon_O$ is a daily opening rate of the day prior to the target date, $\varepsilon_D$ is a convergence strain rate of the day prior to the target date, and $\omega_i$ is a damping weight applied to the daily opening rate of the day prior to the target date.

20. The system of claim 19, wherein the operations further comprise determining openings for the target date based on:

$$O_d = \max\{\omega_d \varepsilon_{A_{d-1}} - \varepsilon_{D_d}, \varepsilon_{O_d}\},$$

wherein d is the target date, and wherein $O_d$ represents an opening for the target date.

* * * * *